(12) United States Patent
Aoki et al.

(10) Patent No.: US 8,873,351 B1
(45) Date of Patent: Oct. 28, 2014

(54) THERMALLY-ASSISTED MAGNETIC RECORDING HEAD, HEAD GIMBAL ASSEMBLY, AND MAGNETIC RECORDING DEVICE

(71) Applicant: TDK Corporation, Tokyo (JP)

(72) Inventors: Susumu Aoki, Tokyo (JP); Kosuke Tanaka, Tokyo (JP); Shinji Hara, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 14/011,910

(22) Filed: Aug. 28, 2013

(51) Int. Cl.
  *G11B 11/00* (2006.01)
  *G11B 5/48* (2006.01)
  *G11B 5/00* (2006.01)

(52) U.S. Cl.
  CPC ...... *G11B 5/4866* (2013.01); *G11B 2005/0021* (2013.01)
  USPC .................. 369/13.33; 369/13.13; 369/112.27

(58) Field of Classification Search
  CPC ........... G11B 2005/0021; G11B 5/314; G11B 5/6088; G11B 2005/001; G11B 7/387; G11B 11/10554; G11B 11/1058; G11B 7/1384; G11B 7/1206
  USPC .......... 369/13.33, 13.32, 13.24, 13.14, 13.03, 369/13.12, 13.13, 13.22, 13.01, 112.27; 360/59, 125.74
  See application file for complete search history.

(56) References Cited

U.S. PATENT DOCUMENTS

| | | | |
|---|---|---|---|
| 8,169,861 B1 | 5/2012 | Komura et al. | |
| 8,305,849 B2 | 11/2012 | Hara et al. | |
| 8,750,082 B1 * | 6/2014 | Shimazawa et al. | 369/13.33 |
| 2013/0091695 A1 * | 4/2013 | Shimazawa et al. | 29/601 |
| 2014/0043948 A1 * | 2/2014 | Hirata et al. | 369/13.24 |

OTHER PUBLICATIONS

U.S. Appl. No. 13/773,218, filed Feb. 21, 2013, Shimazawa et al.

* cited by examiner

*Primary Examiner* — Ali Neyzari
(74) *Attorney, Agent, or Firm* — Posz Law Group, PLC

(57) ABSTRACT

A thermally assisted magnetic recording head includes a plasmon-generator that generates near-field light (NF light) from a near-field light generating portion on a near field light generator end surface constituting a portion of the medium opposing surface. The plasmon-generator has a first PG part having the near field light generator end surface constituting a portion of the medium opposing surface, and a second PG part positioned at a back side compared to the medium opposing surface when viewed from the medium opposing surface side. When viewed from the medium opposing surface side, the first PG part extends toward the back side from the medium opposing surface, and the second PG part is placed to contact at least a portion of both side surfaces of the first PG part. A material that configures the first PG part is a material having high thermostability compared to a material that configures the second PG part, and the material that configures the second PG part is a material having high excitation efficiency of plasmon compared to the material that configures the first PG part.

11 Claims, 18 Drawing Sheets

THERMALLY-ASSISTED MAGNETIC RECORDING HEAD, HEAD GIMBAL ASSEMBLY, AND MAGNETIC RECORDING DEVICE

BACKGROUND OF THE INVENTION

1. Field of the Invention

The present invention relates to a thermally-assisted magnetic recording head that irradiates near-field light (NF light) to a magnetic recording medium, decreases an anisotropic field of the magnetic recording medium and records data, a head gimbal assembly using the head and a magnetic recording device.

2. Description of the Related Art

In the field of magnetic recording using a head and a medium, further performance improvements of thin film magnetic heads and magnetic recording media have been demanded in conjunction with a growth of high recording density of magnetic disk devices. Currently, composite type thin film magnetic heads are widely used for the thin film magnetic heads. The composite type thin film magnetic heads have a configuration in which a magnetoresistive (MR) element for reading and an electromagnetic conversion element for writing are laminated.

The magnetic recording medium is a discontinuous medium in which magnetic grains are aggregated, and each of the magnetic grains has a single magnetic domain structure. In this magnetic recording medium, a single recording bit is configured with a plurality of magnetic grains. Therefore, in order to increase recording density, asperities at a border between adjacent recording bits need to be reduced by decreasing the sizes of the magnetic grains. However, reducing the magnetic grains in size leads to a decrease in the volumes of the magnetic grains, and thereby drawbacks occur in that thermal stability of magnetization in the magnetic grains decreases.

As a countermeasure against this problem, increasing magnetic anisotropy energy Ku of magnetic grains may be considered; however, the increase in Ku causes an increase in an anisotropic magnetic field (coercive force) of the magnetic recording medium. On the other hand, the upper limit of the writing magnetic field intensity of the thin film magnetic head is substantially determined by saturation magnetic flux density of a soft magnetic material configuring a magnetic core in the head. As a result, when the anisotropic magnetic field of the magnetic recording medium exceeds an acceptable value determined by the upper limit of the writing magnetic field intensity, it becomes impossible to write to the magnetic recording medium. Currently, as a method to solve such a thermal stability problem, a so-called thermally-assisted magnetic recording method has been proposed in which, while a magnetic recording medium formed of a magnetic material with large Ku is used, under a state where the anisotropic magnetic field is reduced by heating the magnetic recording medium, a writing magnetic field is applied and the writing of information is performed.

In the thermally-assisted magnetic recording method, a method that uses a near-field light probe, or so-called plasmon-generator having a metal piece that generates near-field light from plasmon excited by laser light, is generally known.

The conventionally-proposed magnetic recording head equipped with a plasmon-generator has a configuration where a magnetic pole that generates the writing magnetic field is established closer to the trailing side than a near-field light generating portion of the plasmon-generator, and a waveguide that propagates light to be opposed to the plasmon-generator, is closer to the leading side than the near-field light generating portion. The plasmon-generator is coupled with light propagating in the waveguide in a surface plasmon mode to excite the surface plasmon, and generates NF light at the near-field light generating portion because the surface plasmon propagates through the plasmon generator. Then, the magnetic recording medium is heated by the NF light generated at the near-field light generating portion of the plasmon-generator, and, after the anisotropic field of the magnetic recording medium is reduced, the writing magnetic field is applied and information is written.

In such a magnetic recording head, when the NF light is generated at the plasmon-generator to reduce the anisotropic field of the magnetic recording medium, the vicinity of the near-field light generating portion of the plasmon-generator is also heated by the NF light. Due to the heating, the vicinity of the near-field light generating portion of the plasmon-generator configured with metal is likely to be deformed. If the plasmon-generator is deformed, it becomes difficult to generate NF light that can effectively heat a magnetic recording medium.

In order to solve such problem, although a metallic material with high thermostability (for example, metallic materials or alloy materials with a high melting point) may be used to configure the plasmon-generator, the coupling efficiency to couple light that propagates through a waveguide in the surface plasmon mode is decreased and generating efficiency of the NF light is decreased. Consequently, a metallic material that has high thermostability and that can efficiently generate the NF light is required to configure the plasmon-generator.

In the thermally-assisted magnetic recording head, it is desirable to increase a ratio of temperature of a magnetic recording medium (temperature of a recording layer of a magnetic recording medium) to a temperature in the vicinity of the near-field generating portion (head surface temperature) upon irradiating NF light (MH ratio).

SUMMARY OF THE INVENTION

It is an object of the present invention to provide a thermally-assisted magnetic recording head that can generate near-field light (NF light), that is heatable to sufficiently reduce an anisotropic field of a magnetic recording medium, and that has a plasmon-generator that can suppress deformation due to the NF light; a head gimbal assembly using the head; and a magnetic recording apparatus.

In order to accomplish the objective above, the present invention provides a thermally-assisted magnetic recording head, provided with; a magnetic pole that generates a writing magnetic field from an end surface constituting a portion of a medium opposing surface that is opposed to a magnetic recording medium; a waveguide in which light for exciting a surface plasmon propagates; and a plasmon-generator that generates near-field light (NF light) from a near-field light generating portion on a near field light generator end surface constituting a portion of the medium opposing surface by coupling with the light in a surface plasmon mode. The plasmon-generator has a first PG part having the near field light generator end surface constituting a portion of the medium opposing surface, and a second PG part positioned at a back side compared to the medium opposing surface when viewed from the medium opposing surface side. When viewed from the medium opposing surface side, the first PG part extends toward the back side from the medium opposing surface, and when viewed from the medium opposing surface side to allow a trailing side of the thermally-assisted magnetic recording head to be upwardly positioned, the second PG part is placed to contact at least a portion of both side surfaces of the first PG part. A material that substantially configures the first PG part is a material having high thermostability compared to a material that substantially configures the second PG part. The material that substantially configures the second PG part is a material having high excitation efficiency of plasmon compared to the material that substantially configures the first PG part.

According to the invention (Invention 1) above, because the second PG part having high excitation efficiency is opposed to a waveguide at a back side compared to a medium opposing surface, sufficient NF light can be generated from the plasmon-generator. In the meantime, since the first PG part configured with a material having high thermostability has an NF light generating end surface constituting a portion of the medium opposing surface, deformation and the like of the NF light generating end surface due to the NF light can be suppressed.

In the invention (Invention 1) above, it is preferable that the material that substantially configures the second PG part be gold (Au) and the material that substantially configures the first PG part be a gold-containing alloy (Invention 2), and the gold-containing alloy is preferably an alloy of one or more elements selected from a group constituting Cu, Co, Ni, Fe, Ta, Mg, Cr, Ti, Ag, Pt, Pd, Ru and Al with Au (gold) (Invention 3).

In the invention (Invention 1) above, the first PG part can be nearly cuboid-shaped (Invention 4). Further, in the invention (Invention 1) above, the second PG part has a front end portion positioned at the medium opposing surface side and a rear end portion positioned at the back side compared to the front end portion, and it is preferable that width of the second PG part in the track width direction be gradually increased from the front end portion toward the rear end portion (Invention 5).

In the invention (Invention 1) above, the length of the first PG part along a light propagation direction of the waveguide is preferably 0.15 μm or greater (Invention 6).

In the invention (Invention 1) above, the second PG part has a front end portion positioned at the medium opposing surface side and a rear end portion positioned at the back side compared to the front end portion, and an end surface opposed to the end surface constituting a portion of the medium opposing surface in the first PG part may be co-planar with the rear end portion of the second PG part (Invention 7); may be positioned at the medium opposing surface side compared to the rear end portion of the second PG part (Invention 8); or may be positioned at the back side compared to the rear end portion of the second PG part (Invention 9).

Further, the present invention provides a head gimbal assembly that is equipped with the thermally-assisted magnetic recording head relating to the invention (Invention 1) and a suspension supporting the thermally-assisted magnetic recording head (Invention 10).

In addition, the present invention provides a magnetic recording device equipped with a magnetic recording medium, the thermally-assisted magnetic recording head relating to the invention (Invention 1) above, and a positioning device that supports the thermally-assisted magnetic recording head, and that positions the thermally-assisted magnetic recording head relative to the magnetic recording medium (Invention 11).

According to the present invention, with a thermally-assisted magnetic recording head that can generate NF light, that is heatable so as to sufficiently reduce an anisotropic field of a magnetic recording medium, and that has a plasmon-generator where deformation and the like due to the NF light is suppressed, the head gimbal assembly using the head and the magnetic recording device can be provided.

DESCRIPTION OF THE PREFERRED EMBODIMENTS

Prior to explaining embodiments of the present invention, terminology used in the present specification is defined. In a lamination structure or an element structure formed on an element formation surface of a slider substrate of a thermally-assisted magnetic recording head relating to one embodiment of the present invention, from the perspective of a layer or an element to be a reference, the substrate side is the "lower side" and its opposite side is the "upper side." Further, w from a layer or an element to be a reference, the medium opposing surface side is the "front side" and its opposite side is the "back side" or "rearward". In addition, in the magnetic recording head relating to one embodiment of the present invention, as appropriate, in some drawings, "X-, Y- and Z-axis directions" are defined. Herein, the Z-axis direction is the above-mentioned "vertical direction," and +Z side is equivalent to a trailing side and −Z side is equivalent to a reading side. Further, the Y-axis direction is a track width direction, and the X-axis direction is a height direction.

[Configuration of Thermally-Assisted Magnetic Recording Head and Magnetic Recording Device]

The thermally-assisted magnetic recording head relating to one embodiment of the present invention is explained hereafter with reference to the drawings.

Figure 1:
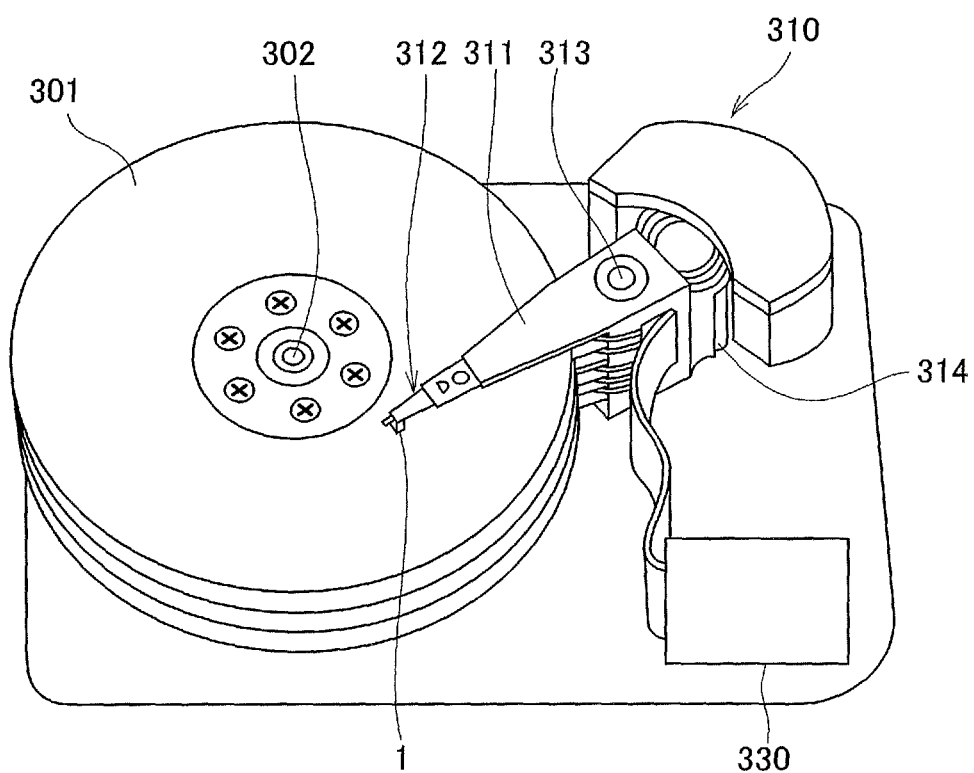
FIG. 1 is a perspective view schematically showing a magnetic recording device in one embodiment of the present invention.
Figure 2:
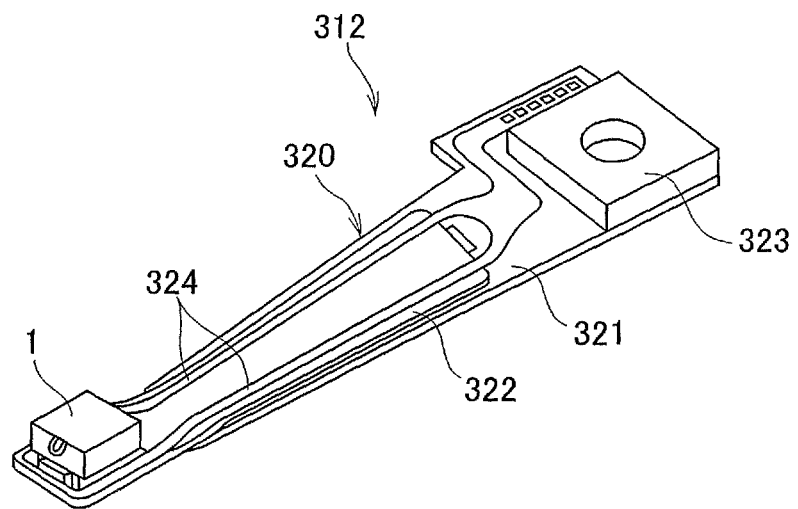
FIG. 2 is a perspective view schematically showing a head gimbal assembly (HGA) in one embodiment of the present invention.
Figure 3:
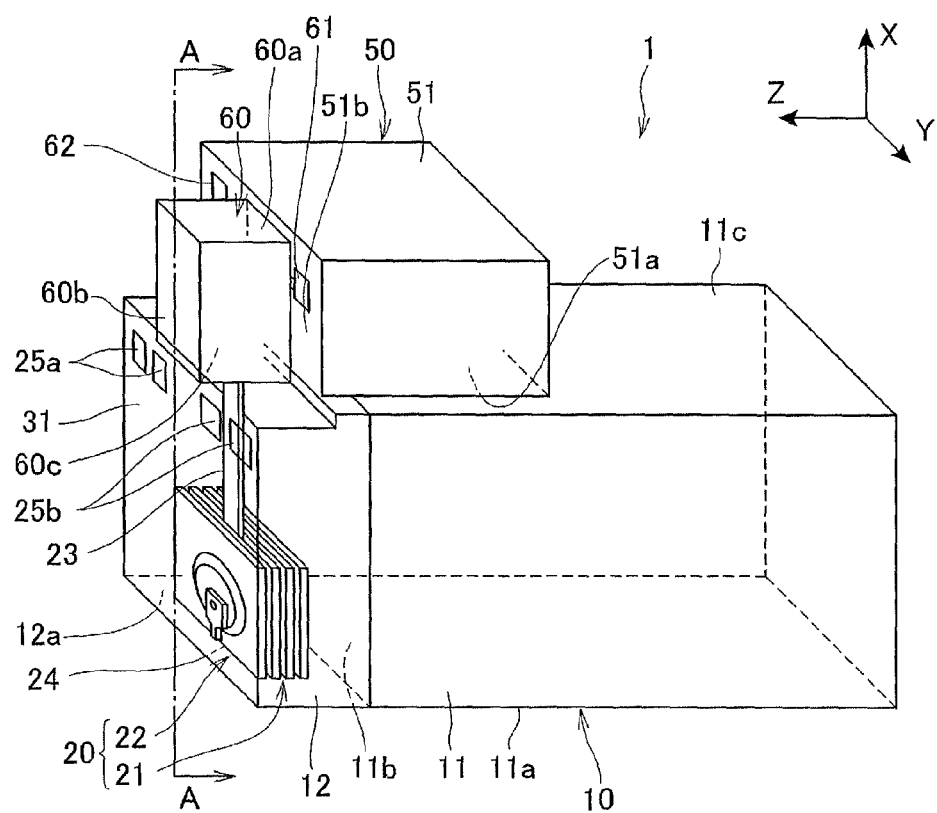
FIG. 3 is a perspective view showing a thermally-assisted magnetic recording head relating to one embodiment of the present invention.

FIG. 1 is a perspective view schematically showing a magnetic recording apparatus in the present embodiment; FIG. 2 is a perspective view schematically showing a head gimbal assembly (HGA) in the present embodiment; and FIG. 3 is a perspective view showing a thermally-assisted magnetic recording head relating to the present embodiment.

As shown in FIG. 1, a magnetic disk apparatus as a magnetic recording apparatus in the present embodiment includes a plurality of magnetic disks 301 that rotate around an axis of rotation of a spindle motor 302; an assembly carriage device 310 where a plurality of drive arms are placed; a head gimbal assembly (HGA) 312 that is mounted at the front end portion of each drive arm 311, and that has a thermally-assisted magnetic recording head 1 relating to the present embodiment, which is a thin film magnetic head; and a control circuit 330 that controls writing and reading operations of the thermally-assisted magnetic recording head 1 relating to the present embodiment, and that controls the light emission operation of a laser diode, which is a light source generating a laser beam for thermally-assisted magnetic recording, as will be described later.

In the present embodiment, the magnetic disks 301 are for perpendicular magnetic recording, and have a structure where a soft magnetic under layer, an intermediate layer and a magnetic recording layer (perpendicular magnetization layer) are sequentially laminated on a disk substrate.

The assembly carriage device 310 is a device for positioning the thermally-assisted magnetic recording head 1 on a track which is formed in the magnetic disk 301, and where recording bits are aligned. In the assembly carriage device 310, the drive arms 311 are stacked in the direction along a pivot bearing shaft 313, and are angularly swingable centering on the pivot bearing shaft 313 by a voice coil motor (VCM) 314.

Furthermore, the structure of the magnetic disk apparatus is not limited to the structure described above, but the magnetic disk 301, the drive arm 311, the HGA 312 and the thermally-assisted recording head 1 can be a single unit.

In the HGA 312 shown in FIG. 2, a suspension 320 is provided with a load beam 321; a flexure 322 attached to the load beam 321, and having elasticity; and a base plate 323 placed in a basal portion of the load beam 321. Further, a wiring member 324 made of a lead conductor and a connection pad, which are electrically connected to its both ends, is placed on the flexure 322. The thermally-assisted magnetic recording head 1 relating to the present embodiment is attached to the flexure 322 at the front end portion of the suspension 320 so as to be opposed to the surface of each magnetic disk 301 with a predetermined gap (flying height). In addition, one end of the wiring member 324 is electrically connected to a terminal electrode of the thermally-assisted magnetic recording head 1 relating to the present embodiment. Furthermore, the structure of the suspension 320 in the present embodiment is also not limited to the structure described above.

As shown in FIG. 3, the thermally-assisted magnetic recording head 1 relating to the present embodiment is provided with a slider 10 and a light source unit 50. The slider 10 is formed of AlTiC ($Al_2O_3$—TiC) and the like, and is provided with a slider substrate 11 having an air bearing surface (ABS) 11a as a recording medium opposing surface to obtain an appropriate flying height; and a head part 12 formed on a perpendicular element formation surface 11b, which is perpendicular to the ABS 11a.

Further, the light source unit 50 is formed of AlTiC ($Al_2O_3$—TiC) and the like, and is provided with a unit substrate 51 having a joining surface 51a; and a laser diode 60 as a light source placed on a light source installation surface 51b, which is perpendicular to the joining surface 51a.

Herein, the slider 10 and the light source unit 50 are mutually bonded by bonding a back surface 11c of the slider substrate 11 and the joining surface 51a of the unit substrate 51. The back surface 11c of the slider substrate 11 means an end surface opposite from the ABS 11a of the slider substrate 11. Furthermore, the thermally-assisted magnetic recording head 1 relating to the present embodiment may have a configuration where the laser diode 60 is directly mounted on the slider 10 without using the light source unit 50.

A head part 12 formed on the element formation surface 11b of the slider substrate 11 is provided with a head element 20 having an MR element 21 for reading data from the magnetic disks 301 and an electromagnetic transducer element 22 for writing data into the magnetic disks 301; a waveguide 23 for guiding a laser beam from the laser diode 60 provided in the light source unit 50 to the medium opposing surface side; a plasmon-generator 24 configuring a near-field light generating optical system along with the waveguide 23; a protective layer 31 formed on the element formation surface 11b so as to cover the MR element 21, the electromagnetic transducer element 22, the waveguide 23 and the plasmon-generator 24; a pair of first terminal electrodes 25a that are exposed to the upper surface of the protective layer 31 and are electrically connected to the MR element 21; and a pair of second terminal electrodes 25b that are exposed to the upper surface of the protective layer 31, and are electrically connected to the electromagnetic transducer element 22. The first and second terminal electrodes 25a and 25b are electrically connected to a connection pad of the wiring member 324 placed in the flexure 322 (see FIG. 2).

One end of the MR element 21, the electromagnetic transducer element 22, the plasmon-generator 24 and the waveguide 23 reach a head part end surface 12a, which is a medium opposing surface of the head part 12. Herein, the head part end surface 12a and the ABS 11a constitute the medium opposing surface of the entire thermally-assisted magnetic recording head 1 relating to the present embodiment.

At the time of actual writing or reading, the thermally-assisted magnetic recording head 1 flies hydrodynamically above the surface of the rotating magnetic 301 at a predetermined flying height. At this time, end surfaces of the MR element 21 and the electromagnetic transducer element 22 are opposed to the surface of the magnetic recording layer in the magnetic disk 301 via appropriate magnetic spacing. In this state, the MR element 21 senses a data signal magnetic field from the magnetic recording layer and reads the data, and the electromagnetic transducer element 22 applies the data signal magnetic field to the magnetic recording layer and writes the data.

Herein, during writing, laser light that has propagated from the laser diode 60 of the light source unit 50 through the waveguide 23 is coupled with the plasmon-generator 24 in the surface plasmon mode, and the surface plasmon is excited in the plasmon-generator 24. NF light is generated at the end portion of the head part end surface 12a of the plasmon-generator 24. because this surface plasmon is propagated in the plasmon generator 24 toward the head part end surface 12a. The NF light reaches the surface of the magnetic disk 301 and heats the magnetic recording layer portion of the magnetic disk 301, by which the anisotropic field (coercive force) of that portion is decreased to a value where writing can be performed. It becomes possible to perform the thermally-assisted magnetic recording by applying the writing magnetic field to the portion where the anisotropic field has been decreased.

Figure 4:
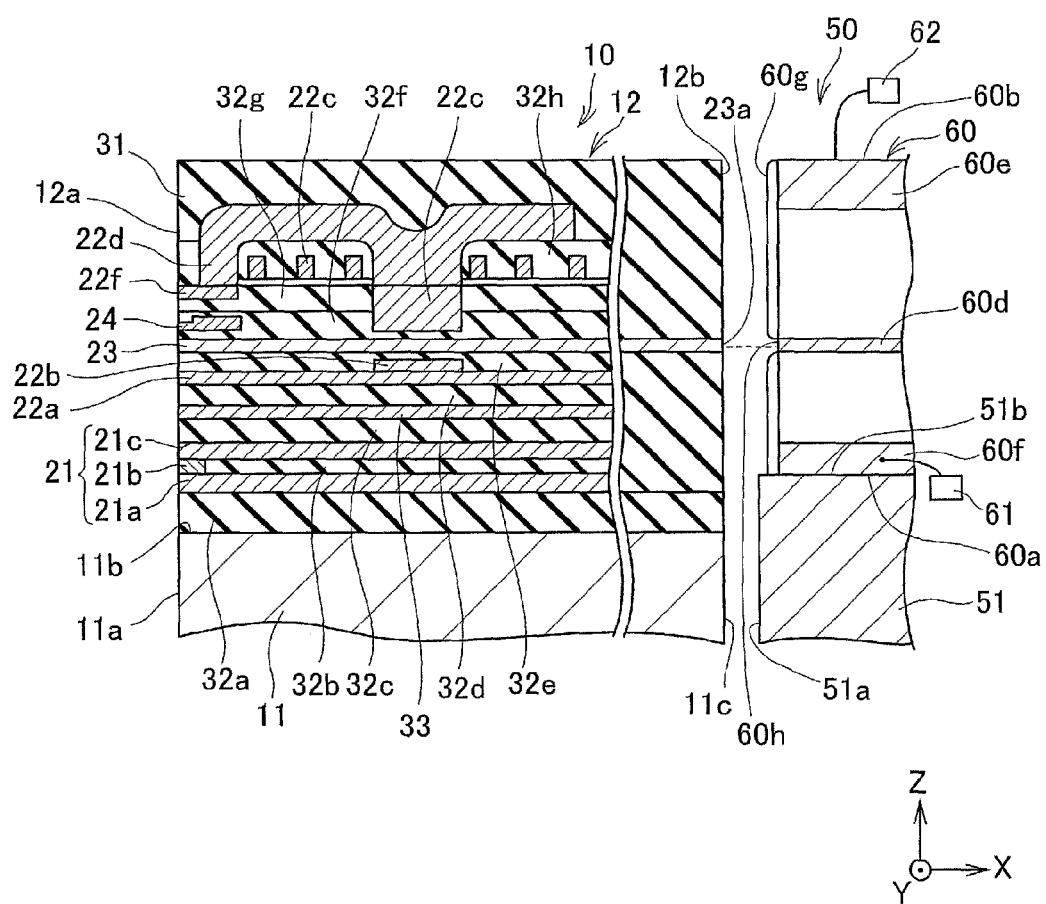
FIG. 4 is an A-A line cross-sectional view (XZ plane) in FIG. 3 schematically showing the configuration of a primary part of the thermally-assisted magnetic recording head relating to one embodiment of the present invention.

FIG. 4 is an A-A-line cross-sectional view (XZ plane) in FIG. 3 that schematically shows the configuration of the thermally-assisted magnetic recording head 1 relating to the present embodiment.

As shown in FIG. 4, the MR element 21 has a lower side shield layer 21a formed on an insulation layer 32a on the element formation surface 11b of the slider substrate 11, an MR multilayer body 21b formed on the lower side shield layer 21a and an upper side shield layer 21c formed on the MR multilayer body 21b, and an insulation layer 32b is established between the lower side shield layer 21a and the upper side shield layer 21c around the MR multilayer body 21b. The lower side shield layer 21a and the upper side shield layer 21c prevent the MR multilayer body 21b from being affected by noise resulting from an external magnetic field.

The lower side shield layer 21a and the upper side shield layer 21c are magnetic layers with approximately 0.5 µm to 3 µM of thickness and are formed, for example, by a frame plating method or a sputtering method, and are made of, for example, a soft magnetic material, such as NiFe (permalloy), FeSiAl (sendust), CoFeNi, CoFe, FeN, FeZrN or CoZrTaCr, or, a multilayer film of these materials.

The MR multilayer body 21b is a magnetically sensitive part that senses a signal magnetic field utilizing the MR effect, and can be, for example, a current in plane-giant magnetoresistive (CIP-GMR) multilayer body utilizing an in-plane current-passage type giant magnetoresistive (GMR), a current perpendicular to plane-giant magnetoresistive (CPP-GMR) multilayer body utilizing a perpendicular current-passage type giant magnetoresistive (GMR) or a tunnel-magnetoresistive (TMR) multilayer body utilizing a tunnel magnetoresistive effect. Furthermore, when the MR multilayer body 21b is a CPP-GMR multilayer body or a TMR multilayer body, the lower side shield layer 21a and the upper side shield layer 21c fulfill the role of an electrode as well. In the meantime, when the MR multilayer body 21b is a CIP-GMR multilayer body, an insulation layer is placed between the MR multilayer body 21b, and between the lower side shield layer 21a and the upper side shield layer 21c, respectively, and in addition, an MR lead layer that is electrically connected to the MR multilayer body 21b is placed.

When the MR multilayer body 21b is a TMR multilayer body, the MR multilayer body 21b has a structure where an antiferromagnetic layer with approximately 5 nm to 15 nm of thickness made of, for example, IrMn, PtMn, NiMn, RuRhMn or the like; a magnetization pinned layer that has a structure where two ferromagnetic layers made of, for example, CoFe or the like, interposing a nonmagnetic metal layer, such as Ru or the like, respectively, and where its magnetization direction is pinned by the antiferromagnetic layer; a tunnel barrier layer made of a nonmagnetic dielectric material where a metal film with approximately 0.5 nm to 1 nm of thickness made of, for example, Al, AlCu, Mg or the like, is oxidized with oxygen introduced into a vacuum device or by natural oxidization; and a magnetized free layer that is configured with a two-layer film, such as CoFe or the like with approximately 1 mm of thickness, which is a ferromagnetic material, such as NiFe and the like with approximately 3 nm to 4 nm of thickness, and that creates a tunnel exchange coupling with the magnetization pinned layer via the tunnel barrier layer are sequentially laminated.

The head part 12 in the present embodiment is provided with a non-magnetic layer 32c placed on the upper shield layer 21c, an interelement shield layer 33 placed on the non-magnetic layer 32c and an insulation layer 32d placed on the interelement shield layer 33. The interelement shield layer 33 may be formed of a soft magnetic material, and has a function to shield the MR element 21 from a magnetic field generated with the electromagnetic transducer element 22 placed on the insulation layer 32d. Furthermore, the nonmagnetic layer 32c and the interelement shield layer 33 may be omitted.

The electromagnetic transducer element 22 is for perpendicular magnetic recording, and is provided with a lower side yoke layer 22a placed on the insulation layer 32d; a first linkage layer 22b placed on the lower side yoke layer 22a at a position away from the head part end surface 12a in the X-axis direction (height direction); a second linkage layer 22c continuing to the first linkage layer 22b; an upper side yoke layer 22d that is placed on the second linkage layer 22c but does not reach the head part end surface 12a; a write coil 22e having a spiral structure that is wound on the center of the second linkage layer 22c so that one turn passes through at least between the lower side yoke layer 22a and the upper side yoke layer 22d; and a magnetic pole 22f continuing to the upper side yoke layer 2d and reaching the head part end surface 12a so as to be a part of the head part end surface 12a.

The head part 12 in the present embodiment is provided with a dielectric layer 32e placed on the lower side yoke layer 22a; a dielectric layer 32f placed around the periphery of the second linkage layer 22c and the periphery of the plasmon-generator 24; a nonmagnetic layer 32g placed on the dielectric layer 32f; an insulation layer 32h placed at the inter-winding and its periphery of the write coil 22e; and a protective layer 32 placed on the upper side yoke layer 22c.

In the head part 12 in the present embodiment, the lower yoke layer 22a, the first linkage layer 22b, the second linkage layer 22c, the upper side yoke layer 22d and the magnetic pole 22f pass magnetic flux corresponding to the magnetic field generated by the write coil 22e through, and configure a magnetic guide path for guiding the magnetic flux to a magnetic recording layer (perpendicular magnetization layer) of the magnetic disk 301. The closest portion to the leading side on the end surface 220 of the magnetic pole 22f constituting a portion of the head part end surface 12a is a point to generate a write magnetic field.

The magnetic pole 22f is preferably formed of a soft magnetic material having higher saturated magnetic flux density than the upper side yoke layer 22d, and for example, is formed of a soft magnetic material, such as FeNi, FeCo, FeCoNi, FeN, FeZrN or the like, which is an iron-based alloy material consisting mainly of iron. Furthermore, the thickness of the magnetic pole 22f in the Z-axis direction can be set to 0.1 µm to 0.8 µm.

Further, the width of the magnetic pole 22f in the Y-axis direction is preferably 0.2 µm to 0.4 µm. If the width of the magnetic pole 22f in the Y-axis direction is within the above range, a magnetic field having writable intensity can be appropriately applied to a heating spot of the magnetic disk 301 to be heated by NF light irradiated from the near field light generator end surface of the plasmon-generator 24.

The end surface of the upper side yoke layer 22d at the side of the head part end surface 12a does not reach the head part end surface 12a, but is positioned in a recessed location at a predetermined distance at the side of the head part rear end surface 12b along the X-axis direction from the head part end surface 12a. By this means, magnetic flux can be converged to the magnetic pole 22f, and the intensity of the magnetic field to be generated from the magnetic pole 22f can be intensified.

The write coil 22e is formed of a conductive material, for example, copper (Cu) and the like. Furthermore, the write coil 22e is one layer in the present embodiment, but it can be two layers or more, and can be a helical coil arranged so as to interpose the upper side yoke layer 22d. Further, the number of windings of the write coil 22e is not particularly limited, but it can be set to, for example, 2 to 7 turns.

The lower side yoke layer 22a is formed on the insulating layer 32d and consists of an insulating material, such as alumina ($Al_2O_3$) and the like, and fulfills the role of a magnetic guide path that guides magnetic flux returned from a soft magnetic under layer placed under a magnetic recording layer (perpendicular magnetization layer) of the magnetic disk 301. The lower side yoke layer 22a is formed of a soft magnetic material, and its thickness is, for example, approximately 0.5 µm to 5 µm.

The waveguide 23 is extended to the front end surface 23b constituting one portion of the head part front end surface 12a from the rear end surface 23a constituting one portion of the head part rear end surface 12b parallel to the element formation surface 11b. The plasmon-generator 24 is placed below (leading side) the magnetic pole 22f to be opposed to the waveguide 23 and having a predetermined space. The waveguide 23 and the plasmon-generator 24 constitute an optical system for NF light generation within the head part 12. Further, a portion interposed between an upper surface (a portion of side surface) of the waveguide 23 and a lower surface of the plasmon-generator 24 is a buffer portion 40 having a lower refractive index than that of the waveguide 23.

The buffer portion 40 fulfills the role of coupling a laser light that propagates through the waveguide 23 to the plasmon-generator 24 in the surface plasmon mode. Furthermore, the buffer portion 40 may be a portion of the dielectric layer 32f, or may be a new layer separately placed from the dielectric layer 32f.

Furthermore, the specific configuration of the magnetic pole 22f, the waveguide 23 and the plasmon-generator 24 will be described later.

As shown in FIG. 4, the light source unit 50 is provided with a unit substrate 51; a laser diode 60 placed on a light source installation surface 51b of the unit substrate 51; a first drive terminal electrode 61 that is electrically connected to an electrode constituting a lower surface 60a (see FIG. 3) of the laser diode 60; and a second drive terminal electrode 62 that is electrically connected to an electrode constituting a upper surface 60b (see FIG. 3) of the laser diode 60. The first and second drive terminal electrodes 61 and 62 are electrically connected to a connection pad of a wiring member 324 (see FIG. 2) placed in the flexure 322 (see FIG. 2). If a predetermined voltage is applied to the laser diode 60 via the first and second drive terminal electrodes 61 and 62, laser light is radiated from the emission center positioned on a light-emitting surface 60c of the laser diode 60. Herein, in the head structure as shown in FIG. 4, it is preferable that the oscillation direction of the electric field of a laser light to be generated by the laser diode 60 be perpendicular (Z-axis direction) relative to the lamination layer plane of an active layer 60d. In other words, the laser light to be generated by the laser diode 60 is preferably polarized light in a TM mode. With this, laser light that propagates through the waveguide 23 can appropriately be coupled to the plasmon-generator 24 in the surface plasmon mode via the buffer portion 40.

The laser diode 60, can be diodes that are normally used for communication applications, such as InP-series, GaAs-series, GaN-series diodes or the like, for optical system disk storage or for material analysis, and having a wavelength a of laser light to be radiated may be within the range, for example, of 375 nm and 1.7 µm.

Specifically, for example, an $InGaAsP/InP_4$ quaternary mixed crystal-series laser diode having a possible wavelength region of 1.2 µM to 1.67 µm is also usable. The laser diode 60 has a multilayered structure containing an upper side electrode 60e, an active layer 60d and a lower side electrode 60f. A reflection layer for exciting oscillation due to total reflection is formed in front of and behind a cleavage surface of the multilayered structure, and in the reflection layer 60g, an opening is placed at a position of the active layer 60d including an emission center 60h. Herein, the thickness of the laser diode 60 can be, for example, approximately 60 µm to 200 µm.

Further, a power source within the magnetic disk apparatus can be used as the driver of the laser diode 60. In actuality, the magnetic disk apparatus is normally provided with, for example, approximately a 5V power source that has sufficient voltage in the laser oscillation operation. Further, power consumption of the laser diode 60 is also, for example, approximately dozens of mW, which can be adequately provided by a power source within the magnetic disk apparatus. In actuality, a predetermined voltage is applied between a first drive terminal electrode 61 that is electrically connected to the lower side electrode 60f and a second drive terminal electrode 62 that is electrically connected to the upper side electrode 60e by the power source, and laser light is radiated from an operating including the emission center 60h of the reflection layer 60g by oscillating the laser diode 60. Furthermore, the laser diode 60 and the first and the second drive terminal electrodes 61 and 62 are not limited to the embodiments described above. For example, in the laser diode, the electrode can be turned upside down, and the upper side electrode 60e may be adhered to the light source installation surface 51b of the unit substrate 51. Further, a laser diode is installed on the element formation surface 11b of the thermally-assisted magnetic recording head 1, and it is also possible to optically connect the laser diode with the waveguide 23. In addition, the thermally-assisted magnetic recording head 1 is not provided with the laser diode 60, and the emission center of the laser diode placed within the magnetic disk apparatus and the rear end surface 23a of the waveguide 23 may be connected, for example, using optical fiber and the like.

The size of the slider 10 and the light source unit 50 can vary. For example, the slider 10 may be a so-called femto slider with 700 µm of width in the track width direction (Y-axis direction)×850 µm of length (in the Z-axis direction)× 230 µm of thickness (in the X-axis direction). In this case, the light source unit 50 may be slightly smaller, for example, with 425 μm of width in the track width direction×300 μm of length×300 μm of thickness.

The thermally-assisted magnetic recording head 1 is configured by connecting the light source unit 50 and the slider 10 described above. In this connection, the bonding surface 51a of the unit substrate 51 and the back surface 11c of the slider substrate 11 are bonded, at which time the positions of the unit substrate 51 and the slider substrate 11 are determined so as to allow a laser light generated from the laser diode 60 to enter into the rear end surface 23a, which is at the opposite side of the ABS 11a in the waveguide 23.

Figure 5:
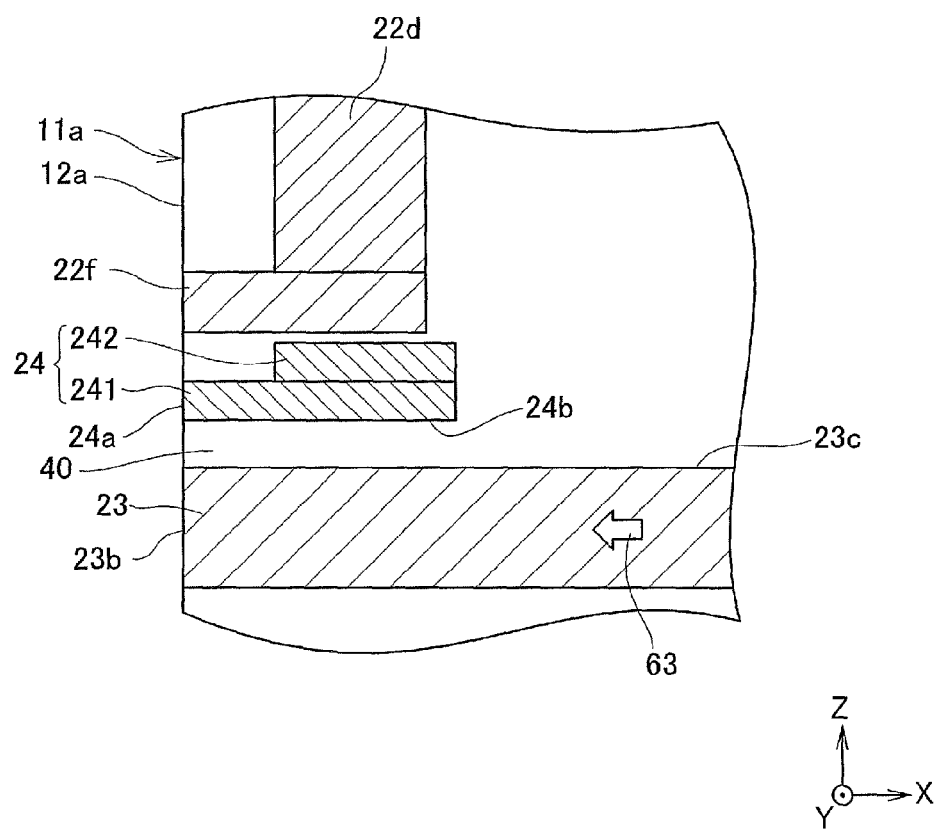
FIG. 5 is a cross-sectional view (XZ plane) schematically showing the configuration of a waveguide, a plasmon-generator and a magnetic pole in the thermally-assisted magnetic recording head relating to one embodiment of the present invention.

Next, a specific configuration of the waveguide 23, the plasmon-generator 24 and the magnetic pole 22f in the thermally-assisted magnetic recording head 1 relating to the present embodiment is explained. FIG. 5 is a cross-sectional view schematically showing the configuration of the waveguide 23, the plasmon-generator 24 and the magnetic pole 22f in the thermally-assisted magnetic recording head 1 relating to the present embodiment.

As shown in FIG. 5, the thermally-assisted magnetic recording head 1 relating to the present embodiment is provided with the waveguide 23 for propagating laser light 63 for NF light generation, and the plasmon-generator 24 where surface plasmon excited by the laser light (waveguide light) 63 propagates.

The plasmon-generator 24 has a near-field light generating end surface 24a that has reached the head part end surface 12a. Further, a portion interposed between a portion of the side surface 23c of the waveguide 23 and the lower surface 24b of the plasmon-generator 24 is the buffer portion 40. This buffer portion 40 fulfills the role of coupling the laser light (waveguide light) with the plasmon-generator 24 in the surface plasmon mode. Further, the lower surface 24b of the plasmon-generator 24 fulfills the role of propagating the surface plasmon excited by the laser light (waveguide light) to the near-field light generating end surface 24a.

Furthermore, the side surface of the waveguide 23 refers to an end surface of other than the front end surface 23b and the rear end surface 23a opposed to the front end surface 23b, among end surfaces that surround the waveguide 23. The side surface of this waveguide 23 becomes a surface where a propagating laser light (waveguide light) can be totally reflected in the waveguide 23 that is equivalent to a core. Furthermore, in the present embodiment, the side surface 23c of the waveguide 23 where its portion makes contact with the buffer portion 40 is an upper surface of the waveguide 23.

More specifically, laser light (waveguide light) moving ahead to the vicinity of the buffer portion 40 is coupled in an optical configuration with the waveguide 23 having a predetermined refractive index nWG, the buffer portion 40 having predetermined refractive index nBF and the plasmon-generator 24 made of a conductive material, such as metal and the like, causes excitation of the surface plasmon mode to the lower surface 24b (surface) of the plasmon-generator 24. In other words, the laser light is coupled with the plasmon-generator 24 in the surface plasmon mode. It becomes possible to excite the surface plasmon mode by setting the reflective index nBF of the buffer portion 40 smaller than the refractive index nWG of the waveguide 23 (nBF<nWG). In actuality, evanescent light is excited within the buffer portion 40 under optical interface conditions between the waveguide 23, which is a core, and the buffer portion 40. Next, the surface plasmon mode is induced in a way to couple the evanescent light with a variable electric charge to be excited on the surface of the plasmon-generator 24, and the surface plasmon 70 is excited. (see FIG. 11).

Space (thickness of the buffer portion 40 immediately under the plasmon-generator 24) between the upper surface (opposing surface of the plasmon-generator 24) of the waveguide 23 and the lower surface 24b of the plasmon-generator 24 is not particularly limited as long as the surface plasmon 70 is excited by the lower surface 24b of the plasmon-generator 24.

The plasmon-generator 24 has a generally cuboid-shaped or generally square-rod-shaped first PG part 241 that extends from the ABS 11a to the perpendicular direction to the ABS 11a, and, a generally parabola-shaped from a plan view perspective, generally semicircle-shaped or generally semi-ellipse shaped second PG part 242 positioned at the back side compared to the ABS 11a. In particular, because the second PG part 242 is generally parabola-shaped from a plan view perspective, it is excited at the second PG part 242, and the surface plasmon propagating toward the ABS 11a can be converged toward the first PG part 241, effectively reducing a loss of the propagating surface plasmon.

Figure 6:
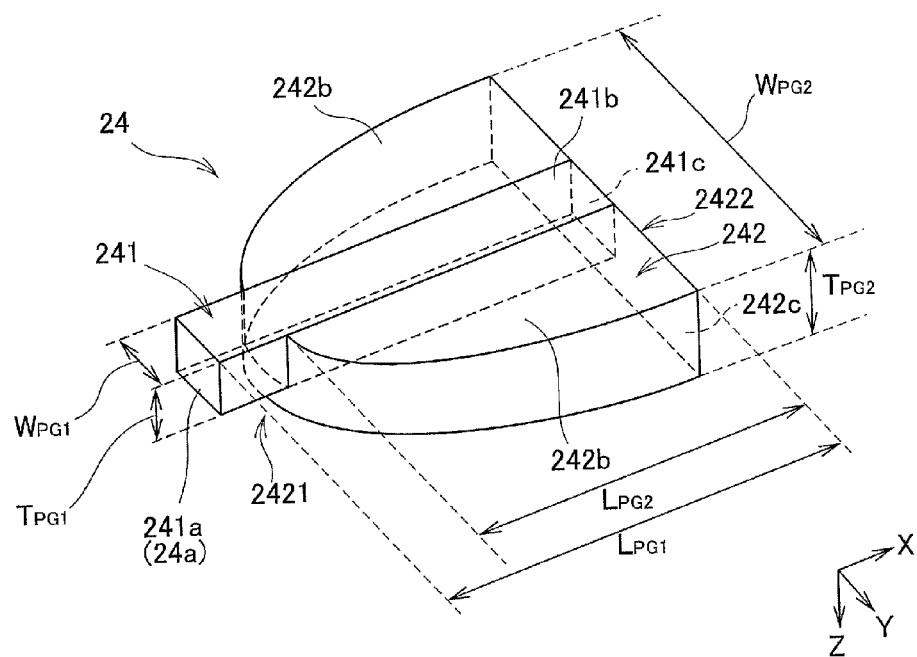
FIG. 6 is a perspective view schematically showing the configuration of the plasmon-generator in one embodiment of the present invention.

As shown in FIG. 6, the first PG part 241 has an end surface 241a (near field light generator end surface 24a) constituting a portion of the head part end surface 12a and an end surface 241c opposed to the end surface 241a. The second PG part 242 makes contact at least with portions of both side surface of the first PG part 241 (both side surfaces at the back side compared to the ABS 11a) when viewed from the ABS 11a side, and the lower surface 241b of the first PG part 241 and the lower surface 242b of the second PG part 242 are coplanar. Preferably, the second PG part 242 makes contact with both side surfaces of the first PG part 241 (both side surfaces at the back side compared to the ABS 11a) and the upper surface (upper surface at the back side compared to the ABS 11). In other words, it is preferable that the second PG part 242 be placed so as to cover both side surfaces and the upper surface of the first PG part 241 at the back side compared to the ABS 11a. In such a mode, the volume of the second PG part 242 can be relatively greater, and its heat dissipation can be improved.

The surface plasmon propagating on the lower surface 242b of the second PG part 242 is effectively transmitted to the lower surface 241b of the first PG part 241 because a portion of both side surfaces of the first PG part 241 makes contact with the second PG part 242, and the surface plasmon can be propagated to the near field light generator end surface 24a positioned at the ABS 11a.

Figure 14A:
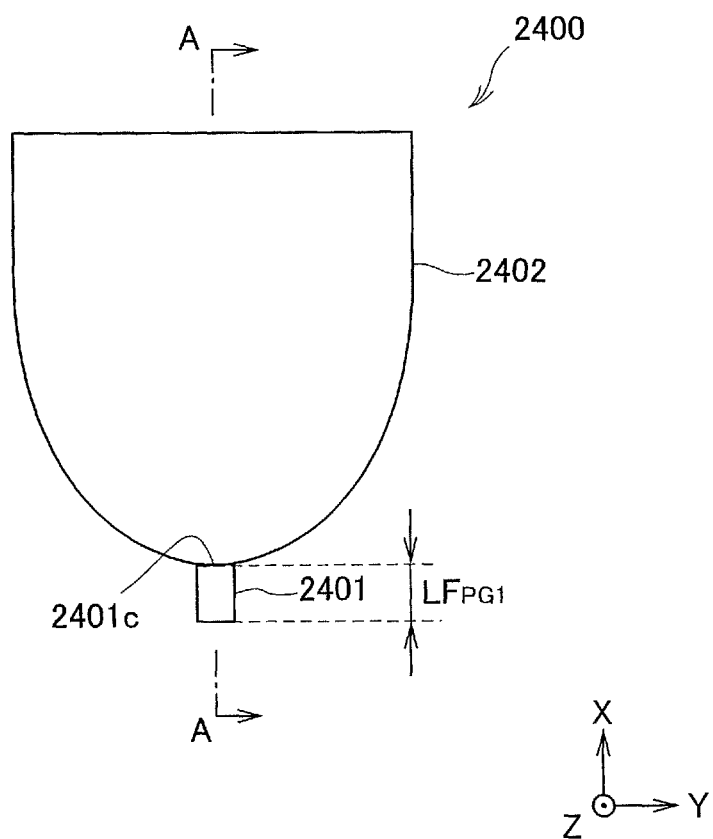
FIG. 14A is a plan view schematically showing an exemplary configuration of the plasmon-generator in Comparative example 1.
Figure 14B:
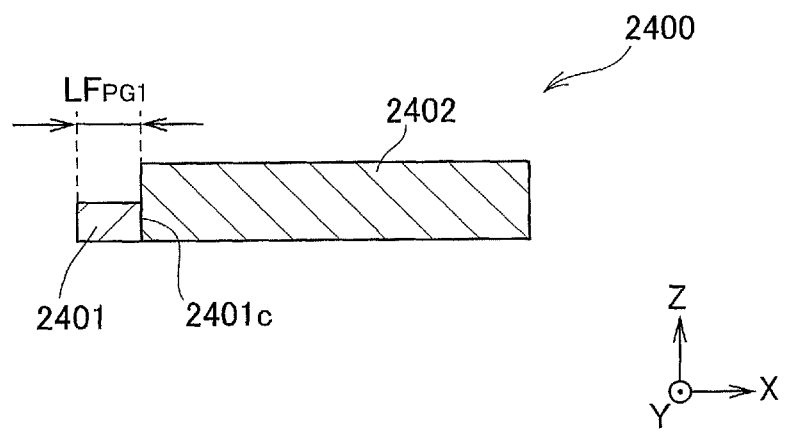
FIG. 14B is an A-A line cross-sectional view (XZ plane) in FIG. 14A.

In order to improve the thermostability in the vicinity of the near-field light generating portion of the plasmon-generator, as shown in FIGS. 14A and 14B, it can also be considered that only a first PG part 2401 in the vicinity of the near-field light generating portion is configured with a material having high thermostability and a second PG part 2402 making contact with a rear end surface 2401c of the first PG part 2401 is configured with a material that has less thermostability but has a high excitation efficiency of the surface plasmon. Even in a plasmon-generator 2400 in such a mode, it is possible to generate NF light with sufficient intensity by the near-field light generating portion of the first PG part 2401. However, as it is clear from experimental examples below, it is not likely to be able to suppress agglomeration deformation of the plasmon-generator 2400 due to heat generation. For example, when the first PG part 2401 is configured with an AuCo alloy having high thermostability and the second PG part 2402 is configured with Au that has less thermostability but high excitation efficiency of the surface plasmon, it is believed that the agglomeration deformation above occurs due to diffusion of the Co atom in the AuCo alloy composing the first PG part

2401 at the side of the second PG part 2402 and reduction of the thermostability of the first PG part 2401.

Figure 7A:
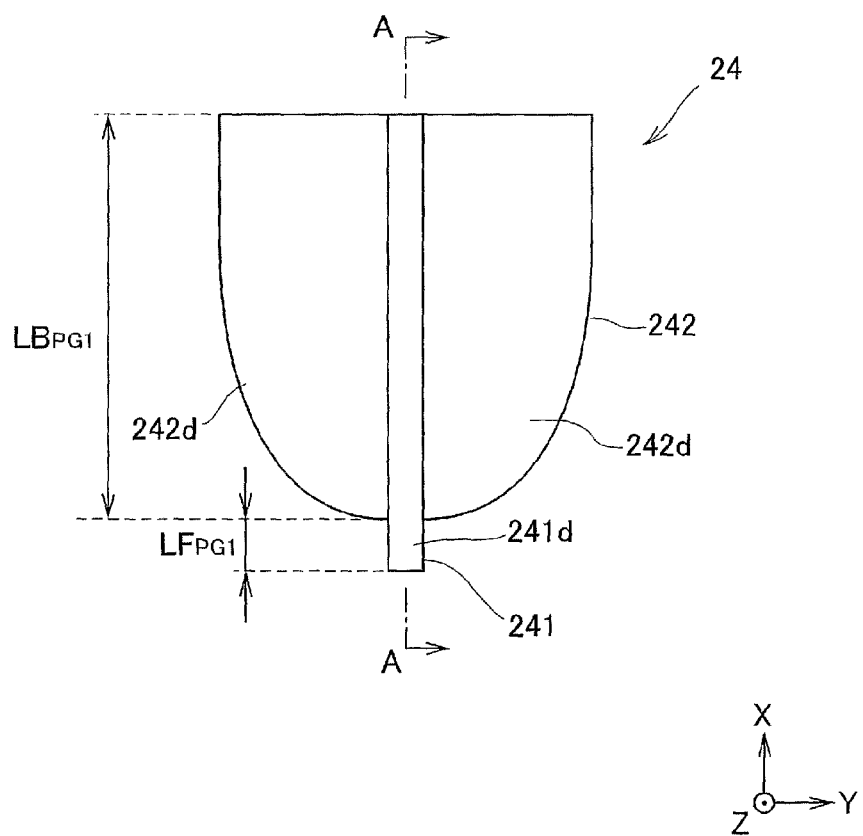
FIG. 7A is a plan view schematically showing another configuration example (No. 1) of the plasmon-generator in one embodiment of the present invention.
Figure 7B:
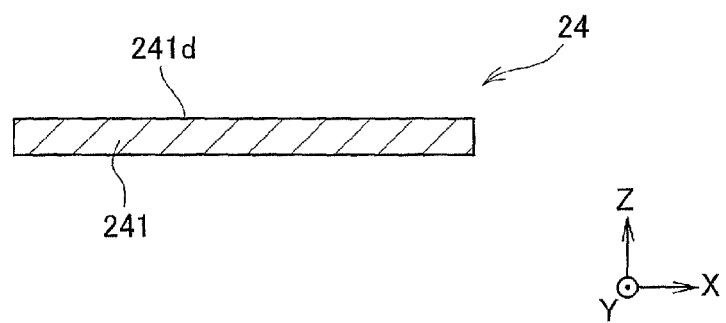
FIG. 7B is an A-A line cross-sectional view (XZ plane) in FIG. 7A.
Figure 8A:
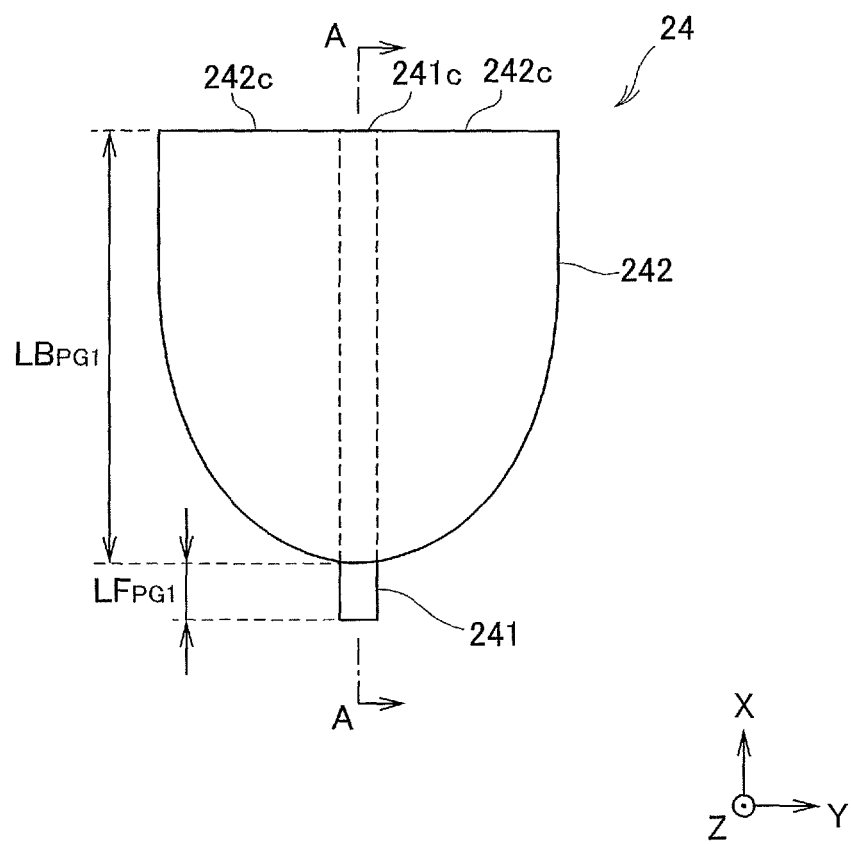
FIG. 8A is a plan view schematically showing a configuration example of the plasmon-generator in one embodiment of the present invention.
Figure 8B:
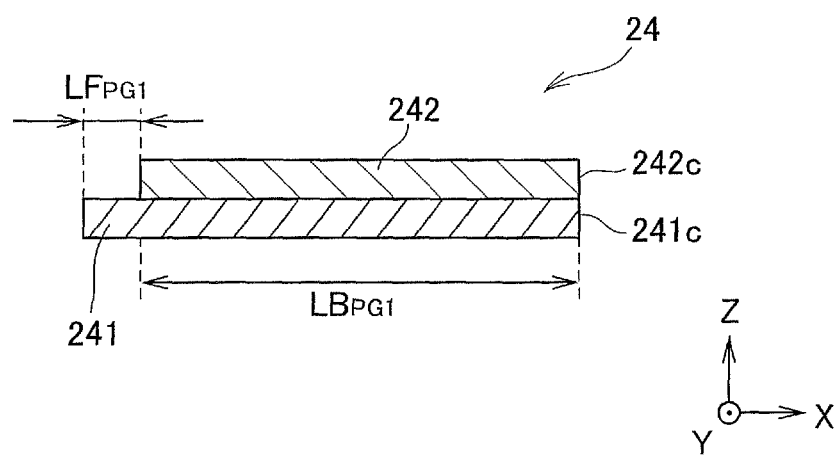
FIG. 8B is an A-A line cross-sectional view (XZ plane) in FIG. 8A.

Furthermore, in the present embodiment, the second PG 242 makes contact with the first PG part 241 so as to cover both side surfaces and the upper surface of the first PG part 241 at the back side compared to the ABS 11a, but it is not limited to such a mode. For example, the second part 242 may be in the mode to make contact with both side surfaces of the first PG part 241 at the back side compared to the ABS 11a but not to make contact with the upper surface. In other words, as shown in FIGS. 7A and 7B, the upper surface 241d of the first PG part 241 and the upper surface 242d of the second part 242 may be co-planar.

The lower surface 24b of the plasmon-generator 24 configured with the lower surface 241b of the first PG part 241 and the lower surface 242b of the second PG part 242 is opposed to the waveguide 23 via the buffer portion 40, and the lower surface 241b of the first PG part 241 extends to the near field light generator end surface 24a. With this, the role of propagating the surface plasmon excited by a laser light (waveguide light), which has propagated through the waveguide 23, in the near field light generator end surface 24a can be fulfilled. In other words, the plasmon-generator 24 is coupled with the waveguide light in the surface plasmon mode; propagates the surface plasmon to the lower surfaces 241b and 242b of the first PG part 241 and the second PG part 242, respectively; and finally propagates the surface plasmon to the near field light generator end surface 24a via the lower surface 241b of the first PG part 241. As a result, NF light is generated from the near-field light generating portion NFP on the near field light generator end surface 24a.

In the present embodiment, a material that substantially configures the first PG part 241 is a material having high thermostability compared to a material that substantially configures the second PG part 242. In other words, a melting point of the material that substantially configures the first PG part 241 is higher than that of the material that substantially configures the second PG part 242. In the meantime, the material that substantially composes the second PG part 242 is a material with a higher excitation efficiency of the surface plasmon than the material that substantially composes the first PG part 241.

The vicinity of the end surface 241a (near field light generator end surface 24a) of the first PG part 241 constituting a portion of the head part end surface 12a is heated by NF light generated from the near-field light generating portion NFP. At this time, if the first PG part 241 is configured with a material having less thermostability, it is likely to deform the vicinity of the near-field light generating portion NFP due to the heat. However, because the first PG part 241 is configured with the material having high thermostability, the deformation of the near-field light generating portion NFP due to heat can be suppressed.

In the meantime, even if the entire plasmon-generator 24 is configured with a material having high thermostability, if the material is a material with low coupling efficiency of the surface plasmon, the coupling efficiency of the surface plasmon is reduced and it is likely difficult to generate NF light with desirable intensity. However, although the material configuring the second PG part 242 is inferior in thermostability compared to the material configuring the first PG part 241, because it is configured with material with excellent coupling efficiency, NF light with desirable intensity can be generated.

Consequently, because the lower surface 24b (the second PG part 242b) of the plasmon-generator 24, which is opposed to the waveguide 23 and excites the surface plasmon, is a material with higher excitation efficiency of the surface plasmon, and the first PG part 241 including the near-field light generating portion NFP is a material having high thermostability, NF light with desirable intensity can be generated and the magnetic disk 301 can be effectively heated. In the meantime, heat generation in the vicinity of the near-field light generating portion NFP can be suppressed. Therefore, a magnetic recording head with a high MH ratio can be realized.

Furthermore, the materials that substantially configure the first PG part 241 and the second PG part 242 are materials that can fulfill roles to be coupled with the waveguide light in the surface plasmon mode, and to propagate the surface plasmon. Therefore, as long as the first PG part 241 and the second PG part 242 can fulfill the roles as a whole, any material(s) that makes it difficult to fulfill the roles may be contained in the first PG part 241 and the second PG part 242.

As the materials that substantially configure the first PG part 241 and the second PG part 242, for example, Cu, Co, Ni, Fe, Ta, Mg, Cr, Ti, Au, Ag, Pt, Pd, Ru and Al, or an alloy with at least two types selected from these metals is preferable. In particular, it is preferable that the material configuring the first PG part 241 is an alloy containing Au (gold-containing alloy), such as AuCo, and the material configuring the second PG part 242 is Au. Because the first PG part 241 is configured with a gold-containing alloy and the second PG part is configured with Au, the excitation efficiency of the surface plasmon on the lower surface of the second PG part 242 opposed to the waveguide 23 can become excellent, and deformation of the vicinity of the near-field light generating portion NFP of the first PG part 241 can be prevented.

If the material configuring the first PG part 241 is a gold-containing alloy, the configuration ratio of metal configuring the alloy can be appropriately set. For example, if the material configuring the first PG part 241 is AuCo, the Co configuration ratio is preferably approximately 0.4 at % to 0.9 at %.

In the plasmon-generator 24, the second PG part 242 has a front end portion 2421 positioned at the ABS 11a side, and a rear end portion 2422 positioned at the back side compared to the front end portion 2421. Then, the width of the plasmon-generator 24 (the second PG part 242) in the track width direction (Y-axis direction) gradually increases toward the rear end portion 2422 from the front end portion 2421 of the second PG part 242. Because the second PG part 242 has such a shape, the surface plasmon can be efficiently excited on the lower surface 242b of the second PG part 242 having a relatively wide area, and the surface plasmon propagating on the lower surface 242b of the second PG part 242 can be converged toward the end surface 241a (near field light generator end surface 24a) of the first PG part 241. As a result, NF light with desirable intensity can be generated.

Width WPG1 of the first PG part 241 in the track width direction (Y-axis direction) is preferably 25 nm to 80 nm, and is more preferably 40 nm to 65 nm. Further, thickness TPG1 in the Z-axis direction is preferably 50 nm to 100 nm, and is more preferably 70 nm to 80 nm. In addition, length LPG 1 in the height direction (X-axis direction) is preferably 0.15 μm to 1.2 μm, and is more preferably 0.2 μm to 1.0 μm. Because the length LPG1 is 0.15 μm or longer, it becomes difficult for the material configuring the first PG part 241 to diffuse toward the second PG part 242 side due to heating, and agglomeration deformation of the plasmon-generator 24 due to heat generation can be suppressed.

Width WPG2 (including the width WPG1 of the first PG part 241, as well) in the track width direction (Y-axis direction) at the rear end portion 2422 of the second PG part 242 is preferably 300 nm to 700 nm, and is more preferably 550 nm to 650 nm. Further, thickness TPG2 in the Z-axis direction is preferably 50 nm to 175 nm, and is more preferably 70 nm to 80 nm. In addition, length LPG2 in the height direction (X-axis direction) is preferably 0.1 µm to 1.2 µm, and is more preferably 0.2 µm to 1.0 µm.

In a plan view of the plasmon-generator 24, length LFPG1 (length of a portion that does not make contact with the second PG part 242 in the vicinity of the end surface 241a of the first PG part 241 in the height direction (X-axis direction), see FIG. 7A to FIG. 10B) of the first PG part 241 from the front end portion 2421 of the second PG part 242 to the ABS 11a is preferably 0.02 µm to 0.2 µm. Further, length LBPG1 (see FIG. 7A to FIG. 10B) of a portion that makes contact with the second PG part 242 in the first PG part 241 in the height direction (X-axis direction) is preferably 0.05 µm or longer, and is preferably 0.1 µm or greater.

In the plasmon-generator 24 in the present embodiment, at the back side compared to the ABS 11a, the second PG part 242 should make contact with a portion on both side surfaces of the first PG part 241. Therefore, the end surface 241c of the first PG part 241 may be co-planar with the rear end surface 242c of the second PG part 242 (see FIG. 8A and FIG. 8B); may be positioned at the ABS 11a side compared to the rear end surface 242c of the second PG part 242 (see FIG. 9A and FIG. 9B); or may be positioned at the back side compared to the rear end surface 242c of the second PG part 242 (see FIG. 10A and FIG. 10B).

As the shape of the waveguide 23, the width in the track width direction (Y-axis direction) may be constant, but the width in the track width direction (Y-axis direction) in a portion positioned in the vicinity of the ABS 11a may be narrower. The width of a portion at the rear end surface 23a side positioned opposite from the front end surface 23b of the waveguide 23 in the track width direction (Y-axis direction) can be, for example, approximately 0.5 µm to 20 µm; the width of a portion at the front end surface 23b side in the track width direction (Y-axis direction) can be, for example, approximately 0.3 µm to 10 µm; the thickness in the Z-axis direction can be approximately 0.1 µm to 4 µm; and the height (length) in the X-axis direction can be, for example, approximately 10 µm to 300 µm.

The upper surface 23c of the waveguide 23 and both of its end surfaces in the track width direction (Y-axis direction) contact the dielectric layer 32f (see FIG. 4) except for a portion contacts the buffer portion 40, and the lower surface of the waveguide 23 contacts the dielectric layer 32e (see FIG. 4). Herein, the waveguide 23 is configured with a material having a higher refractive index nWG than a refractive index nIS of a configuration material of the dielectric layer 32e and the dielectric 32f. For example, when the wavelength λL of a laser light is 600 nm and the dielectric layer 32e and the dielectric layer 32f are formed of $SiO_2$ (silicon dioxide; n=1.46), the waveguide 23 may be formed of $Al_2O_3$ (alumina; n=1.63). In addition, when the dielectric layer 32e and the dielectric 32f are formed of $Al_2O_3$ (n=1.63), the waveguide 23 may be formed of SiOXNY (n=1.7 to 1.85), $Ta_2O_5$ (n=2.16), $Nb_2O_5$ (n=2.33), TiO (n=2.3 to 2.55) or $TiO_2$ (n=2.3 to 2.55). Because the waveguide 23 is configured with such a material, propagation loss of the laser light (waveguide light) 63 can be suppressed because of the excellent optical characteristics of the material itself. In addition, the waveguide 23 functions as a core; in the meantime, the dielectric 32e and the dielectric 32f fulfill a function as a clad, and total reflection conditions on the entire side surface are aligned. With this, more laser light (waveguide light) 63 reaches the position of the buffer portion 40, and the propagation efficiency of the waveguide 23 is improved.

Further, the waveguide 23 has a multilayered structure of a dielectric material(s), and may have a structure where the refractive index increases corresponding to the how high the layer is situated in the structure. For example, such a multi-layered structure is realized by sequentially laminating the dielectric materials where composition ratios of X and Y values are appropriately varied in SiOXNY. The number of laminations can be, for example, 8 layers to 12 layers. As a result, when laser light (waveguide light) is a linear polarized light in the Z-axis direction, it can be propagated more toward the buffer portion 40 side in the Z-axis direction. At this time, a desired propagation position of the laser light (waveguide light) in the Z-axis direction can be realized by selecting a composition, layer thickness and the number of layers of each layer in the multilayered structure.

The buffer portion 40 is formed of a dielectric material having a lower refractive index nBF than a refractive nWF of the waveguide 23. For example, when wavelength λL of the laser light is 600 nm and the waveguide 23 is formed of $Al_2O_3$ (alumina; n=1.63), the buffer portion 40 may be formed of $SiO_2$ (silicon dioxide; n=1.46). Further, when the waveguide 23 is formed of $Ta_2O_5$ (n=2.16), the buffer portion 40 may be formed of $SiO_2$ (n=1.46) or $Al_2O_3$ (n=1.63). In such cases, the buffer portion 40 can be a portion of the dielectric layer 32f (see FIG. 4) as a clad made of $SiO_2$ (n=1.46) or $Al_2O_3$ (n=1.63). Further, the length of the buffer portion 40 (in the X-axis direction), which is a portion interposed between the upper surface 23c of the waveguide 23 and the lower surface 24b of the plasmon-generator 24, is preferably 0.5 µm to 5 µm, and is preferably greater than the wavelength XL of the laser light (waveguide light). In this case, such a portion is a dramatically wider region than a so-called "focal region." For example, in the case of converging laser light to the buffer portion 40 and the plasmon-generator 24 and of coupling in the surface plasmon mode. It becomes possible to be coupled in a very stable plasmon mode. Further, it is preferable that the thickness of the buffer portion 40 (in the Z-axis direction) is 10 nm to 200 nm. Length (in the X-axis direction) and thickness (in the Z-axis direction) of the buffer portion 40 are important parameters in order to obtain appropriate excitation and propagation of the surface plasmon.

The magnetic pole 22f reaches the head part end surface 12a, and the end surface on the head part end surface 12a of the magnetic pole 22f has, for example, a substantially oblong shape, such as rectangular, square, trapezoidal shapes or the like.

[Operation of Thermally-Assisted Magnetic Recording Head]

Figure 11:
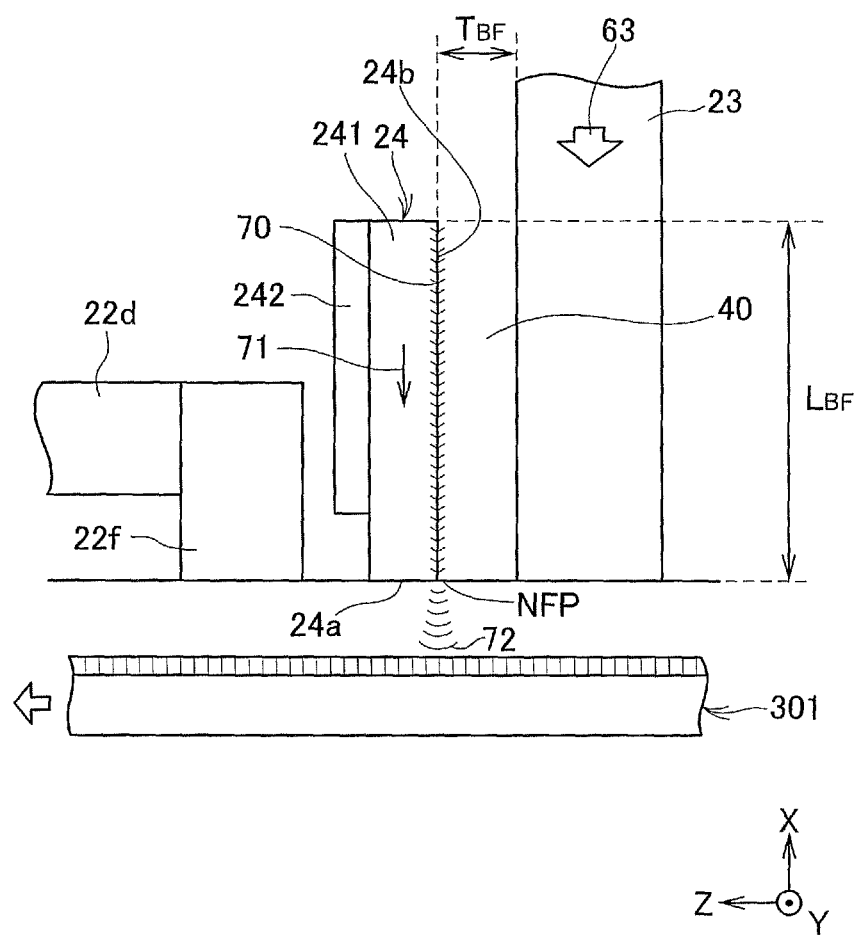
FIG. 11 is a schematic view for explaining a thermally-assisted magnetic recording utilizing a surface plasmon mode in the thermally-assisted magnetic recording head relating to one embodiment of the present invention.

Next, the operation of the thermally-assisted magnetic recording head 1 having the configuration described above relating to the present embodiment is explained. FIG. 11 is a schematic view for the purpose of explaining thermally-assisted magnetic recording utilizing a surface plasmon mode in the thermally-assisted magnetic recording head 1 relating to the present embodiment.

As shown in FIG. 11, when writing into a magnetic recording layer of the magnetic disk 301 by the electromagnetic transducer element 22, at first, the laser light (waveguide light) 63 radiated from the laser diode 60 of the light source unit 50 propagates through the waveguide 23. Next, the laser light (waveguide light) 63 that has moved ahead to the vicinity of the buffer portion 40 is coupled with the optical configuration of the waveguide 23 having the refractive index nWG, the buffer portion 40 having the refractive index nBF and the plasmon-generator 24 made of a conductive material, such as metal, and induces excitation of the surface plasmon mode on the lower surface 24b (mainly the lower surface 242b of the second PG part 242) of the plasmon-generator 24. In other words, it is coupled with the plasmon-generator 24 in the surface plasmon mode. In actuality, evanescent light is excited within the buffer portion 40 according to the optical interface conditions between the waveguide 23, which is a core, and the buffer portion 40. Next, the surface plasmon mode is induced in a way that the evanescent light couples with variation of electric charges excited on the lower surface 24b of the plasmon-generator 24, and the surface plasmon is excited. More precisely, in this system, since the surface plasmon, which is elementary excitation, is coupled with electromagnetic wave, the surface plasmon polariton is excited. However, hereafter, the surface plasmon polariton is abbreviated and referred to as surface plasmon. The excitation of the surface plasmon mode is enabled by setting the refractive index nBF of the buffer portion 40 smaller than the refractive index nWG of the waveguide 23 (nBF<nWG), and in addition, by appropriately selecting the length of the buffer portion 40 (in the X-axis direction), i.e. length LBF of a coupled portion between the waveguide 23 and the plasmon-generator 24 (length of the plasmon-generator 24 in the X-axis direction) and thickness TBF of the buffer portion 40 (in the Z-axis direction).

In the induced surface plasmon mode, the surface plasmon 70 is excited to the lower surface 24b of the plasmon-generator 24, and propagates along the direction of an arrow 71.

Thus, the surface plasmon 70 propagates in the direction of the arrow 71, and the surface plasmon 70, that is, an electric field, is finally converged to the near-field light generating portion NFP on the near field light generator end surface 24a, which is a destination of the first PG part 241. As a result, a near-field light (NF light) 72 is generated from the near-field light generating portion NFP.

Herein, because the second PG part 242 is configured with a material having high the excitation efficiency of the surface plasmon, NF light, which can effectively reduce a magnetic anisotropic field (coercive force) of the magnetic recording layer of the magnetic disk 301, can be generated.

The NF light 72 generated as mentioned above is irradiated toward the magnetic recording layer of the magnetic layer 301, reaches the surface of the magnetic disk 301, and heats the magnetic recording layer portion of the magnetic disk 301. With this, the magnetic anisotropic field (coercive force) of that portion is decreased to a writable value, and writing is conducted by a magnetic field applied to the portion.

Herein, because of the generation of the NF light 72, heat is generated in the vicinity of the near-field light generating portion NFP of the near field light generator end surface 24a. However, in the present embodiment, since the first PG part 241 is configured with a material having high thermostability, the deformation of the vicinity of the near-field light generating portion NFP of the first PG part 241 due to the heat can be suppressed.

[Manufacturing Method for Thermally-Assisted Magnetic Recording Head]

The thermally-assisted magnetic recording head having the configuration described above can be manufactured as described below.

FIGS. 12A to 12F are schematic views showing processes to form the plasmon-generator 24 in the thermally-assisted magnetic recording head 1 relating to the present embodiment. FIGS. 12A to 12F are all plan views showing an YZ plane viewed from the side of the medium opposing surface. Further, FIGS. 13A to 13C are cross-sectional (XZ cross-section) views in FIGS. 12D to 12F, respectively.

First, a metallic film 91 configured with a metal material (such as AuCo alloy and the like) configuring the first PG part 241 is formed on the waveguide 23 and the dielectric layer 32f by sputtering via a cohesion layer 81 made of metal, on which a mask layer 82 made of Ta and the like is formed by sputtering. Furthermore, an intermediate layer 83 configured with metal is formed between the metallic film 91 and the mask layer 82 (see FIG. 12A).

Subsequently, a resist pattern RP1 corresponding to the first PG part 241 is formed on the mask layer 82. Then, a dry etching process, such as reactive ion etching, is applied to the mask layer 82 using the resist pattern RP1 as a mask, and a mask pattern MP1 is formed (see FIG. 12B). At this time, the intermediate 83 between the metallic film 91 and the mask layer 82 can fulfill a role as an etching stopper.

Figure 12A:
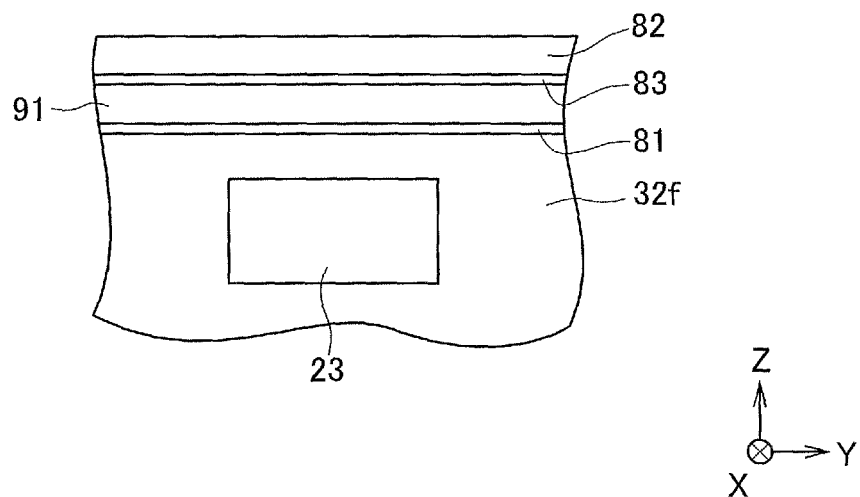
FIGS. 12A to 12F are schematic views showing processes to form the plasmon-generator in the thermally-assisted magnetic recording head relating to one embodiment of the present invention.
Figure 12B:
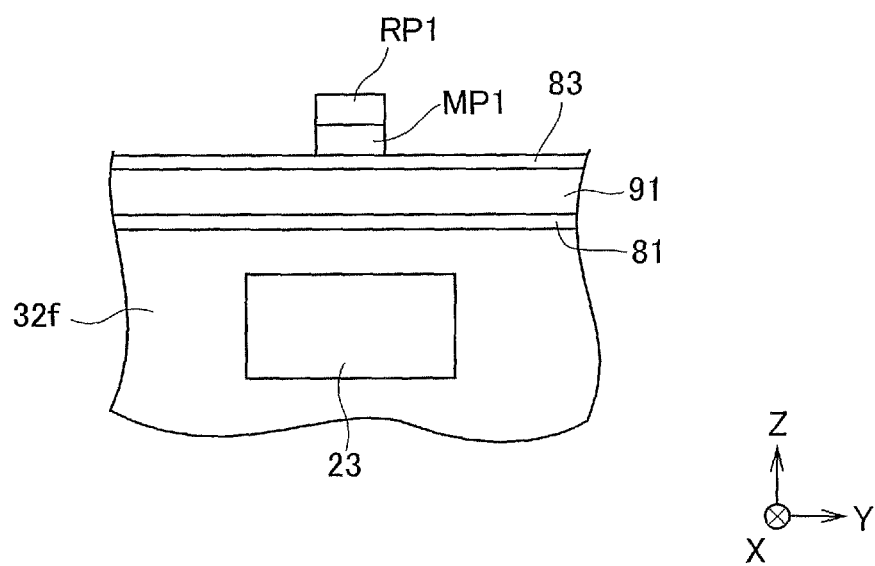
Figure 12C:
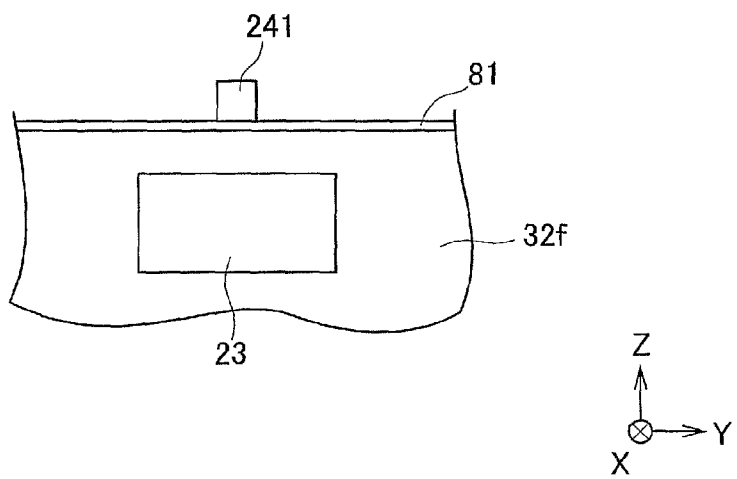
Figure 12D:
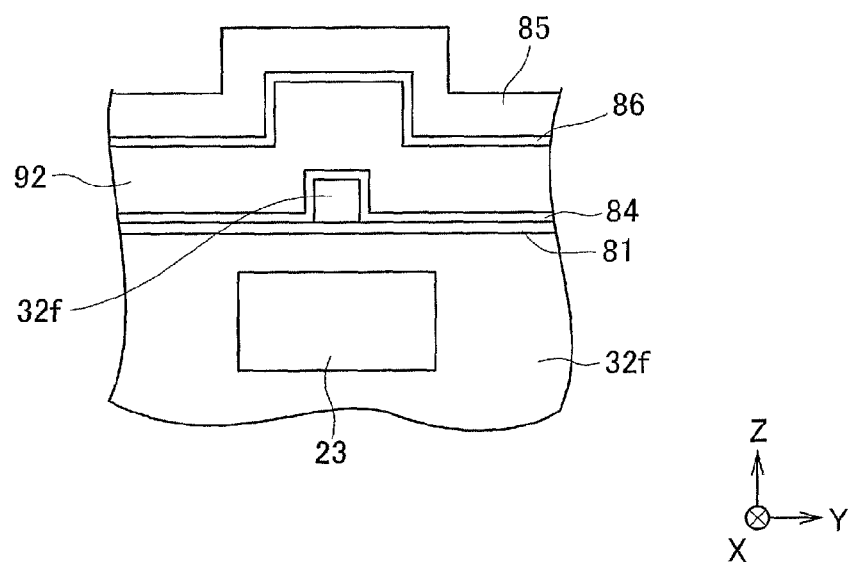
Figure 12E:
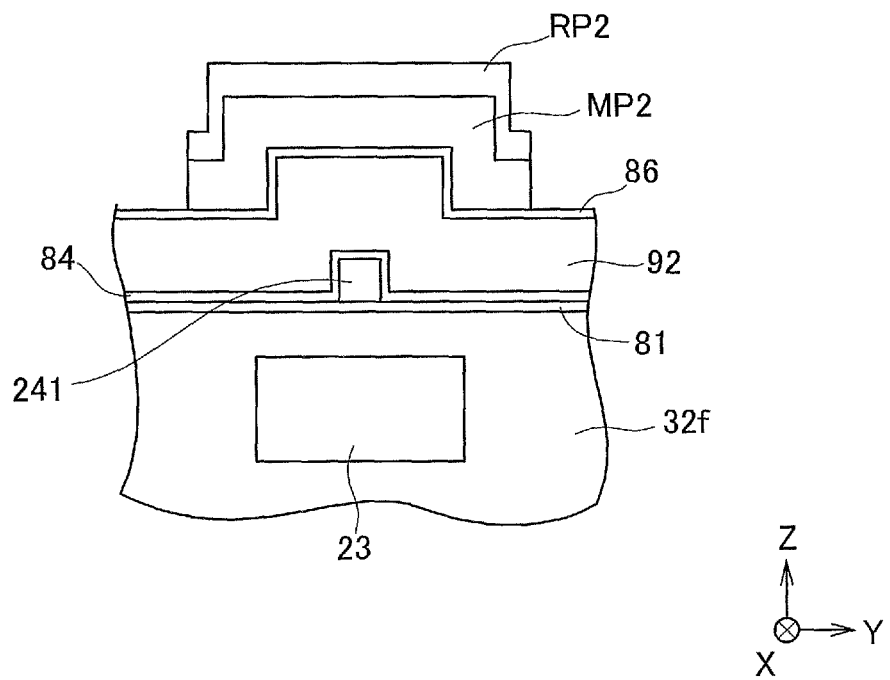
Figure 13A:
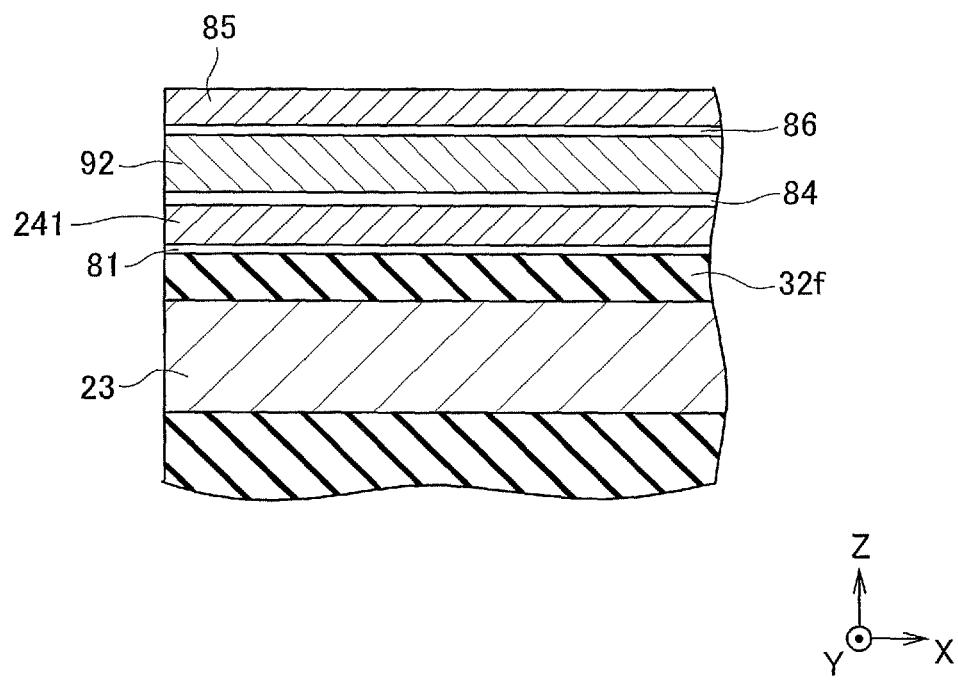
FIGS. 13A to 13C are cross-sectional views showing each process to form the plasmon-generator shown in FIGS. 12D to 12F.
Figure 13B:
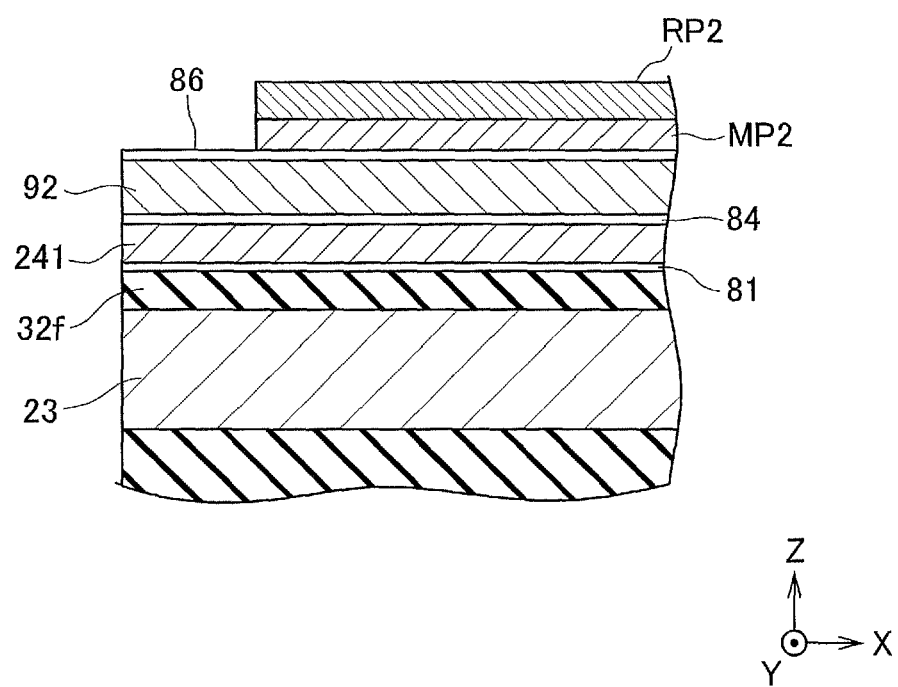
Figure 13C:
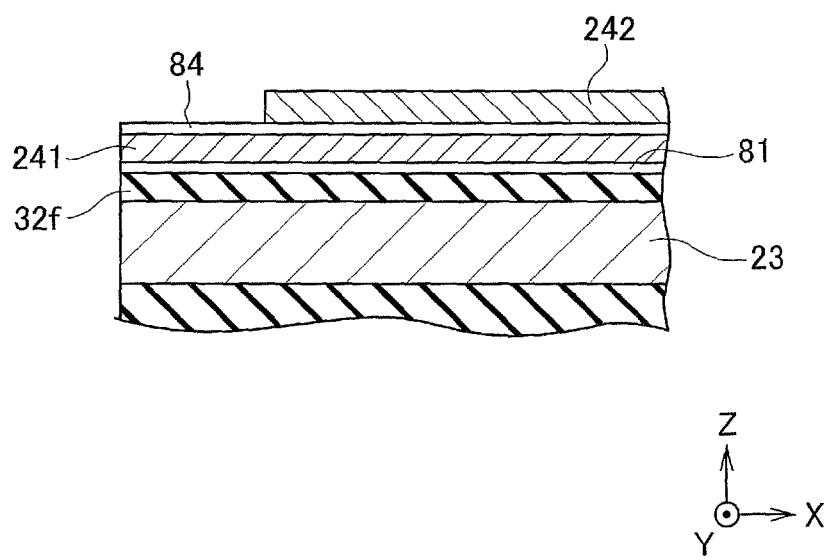

Next, a dry etching process, such as reactive ion etching, is applied to the metallic film 91 using the mask pattern MP1 as a mask, and the first PG part 241 is then formed by applying a milling process if desired (see FIG. 12C).

Next, a cohesion layer 84 is formed to cover the first PG part 241; a metallic film 92 configured with a metal material (such as Au and the like) composing the second PG part 242 is formed on the cohesion layer 84 by sputtering; over which a mask layer 85 generally made of Ta is formed by sputtering. Furthermore, an intermediate layer 86 made of NiFe and the like is formed between the metallic film 92 and the mask layer 85 (see FIG. 12D and FIG. 13A).

Subsequently, a resist pattern RP2 corresponding to the second PG part 242 is formed on the mask layer 85. Then, a dry etching process, such as reactive ion etching, is applied to the mask layer 85 using the resist pattern RP2 as a mask, and a mask pattern MP2 is formed (see FIG. 12E and FIG. 13B). At this time, an intermediate layer 86 between the metallic film 92 and the mask 85 can fulfill a role as an etching stopper.

Figure 12F:
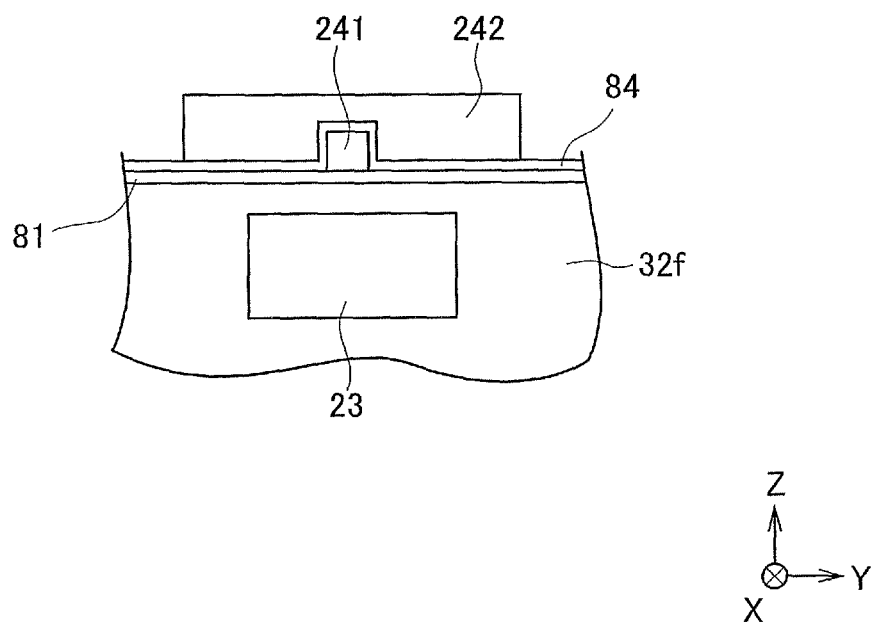

Next, a dry etching process, such as reactive ion etching, is applied to the metallic film 92 using the mask pattern MP2 as a mask, and the second PG part 242 is formed by conducting a planarization process using a polishing method, such as chemical mechanical polishing (CMP) (see FIG. 12F and FIG. 13C).

Thus, after the plasmon-generator 24 having the first PG part 241 and the second PG part 242 is formed, the head part 12 in the present embodiment can be manufactured by forming the magnetic pole 22f using an ordinary method and by finally forming the protective layer 31.

Further, in the manufacturing method described above, although the second PG part 241 is formed by applying the dry etching process to the metallic film 92 using the mask pattern MP2 (see FIGS. 12E to 12F and FIGS. 13B to 13C), the present invention is not limited to such a mode. For example, after the cohesion layer 84 is formed on the first PG part 241, a resist pattern having an opening corresponding to the second PG part 242 is formed, and a metallic film configured with a metal material composing the second PG part 242 is formed. After that, the second PG part 242 may be formed by liftoff.

Further, an electrode layer made of Au and the like is formed instead of the cohesion layer 84 on the first PG part 241, and a resist pattern having an opening corresponding to the second PG part 242 is formed. Then, the second PG part 242 may be formed by plating a metal material configuring the second PG part 242 within the opening.

The embodiment explained above is described in order to facilitate the understanding of the present invention, but it is not described in order to restrict the present invention. Therefore, it is contemplated that each element disclosed in the embodiment above includes all design modifications and their equivalents within the technical scope of the present invention.

EXAMPLES

Hereafter, although the present invention is explained in detail by exemplary experimental examples, the present invention is not limited to the experimental examples described below and the like.

Experimental Example 1

A simulation analysis experiment regarding an MH ratio and a heat gradient (TG) of a recording layer of a magnetic disk upon magnetic recording using a thermally-assisted magnetic recording head was conducted.

Example 1

For the MH ratio and the heat gradient (TG) in the thermally-assisted magnetic recording head 1 in a mode shown in FIGS. 4 to 6 and FIGS. 8A and 8B, a simulation analysis experiment was conducted as mentioned below.

This simulation analysis experiment was conducted using a three-dimensional finite-difference time-domain method (FDTD method), which is an electromagnetic field analysis.

In the present experimental example, a model where the waveguide 23 in the thermally-assisted magnetic recording head 1 was formed of Ta2O5 (n=2.16); the dielectric layer 32$f$ that makes contact with the side surface 23$c$ of the waveguide 23 was formed of $Al_2O_3$ (n=1.63); the first PG part 241 of the plasmon-generator 24 was formed of AuCo (containing 0.9 at % of Co); and the second PG part 242 was formed of Au was adopted.

Further, in the model, the width of the magnetic pole 22$f$ in the track width direction (Y-axis direction) was set to 400 nm; the width of the waveguide 23 in the track width direction (Y-axis direction) was set to 500 nm; the height of the magnetic pole 22$f$ in the Z-axis direction was set to 1,000 nm; and the height of the waveguide 23 in the Z-axis direction was set to 400 nm.

In addition, in the model, the height of the first PG part 241 of the plasmon-generator 24 in the Z-axis direction was set to 80 nm; the height of the second PG part 242 was set to 80 nm; the width of the first PG part 241 in the track width direction (Y-axis direction) was set to 40 nm; the length of the first PG part 241 in the height direction (X-axis direction) was set to 1 µm; and the length of the second PG part 242 in the height direction (X-axis direction) was set to 965 nm. Further, the length LFPG1 (see FIG. 8A and FIG. 8B) of a portion not making contact with the second PG part 242 in the vicinity of the end surface 241$a$ of the first PG part 241 was set at 0.05 µm.

Figure 16:
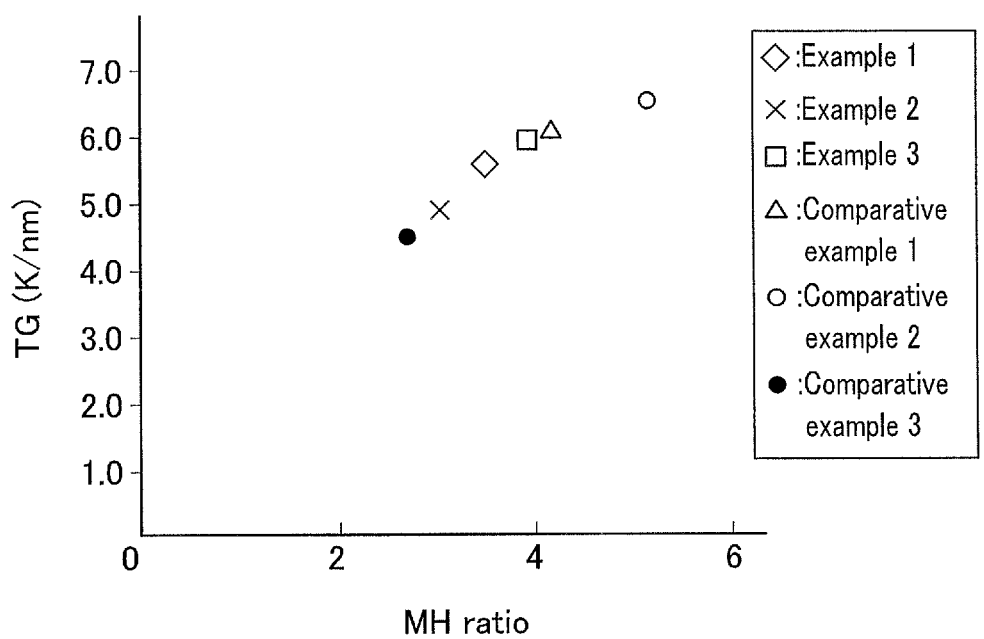
FIG. 16 is a graph showing simulation analysis results in Experimental example 1.

Then, maximum values for the MH ratio and the heat gradient of the recording layer of the magnetic disk 301 were calculated by simulation analysis. Furthermore, the simulation analysis was conducted by setting the wavelength XL of the laser light irradiated from the laser diode 60 to 375 nm, 800 nm and 1,700 nm. The simulation analysis results are shown in FIG. 16.

Example 2

Figure 10A:
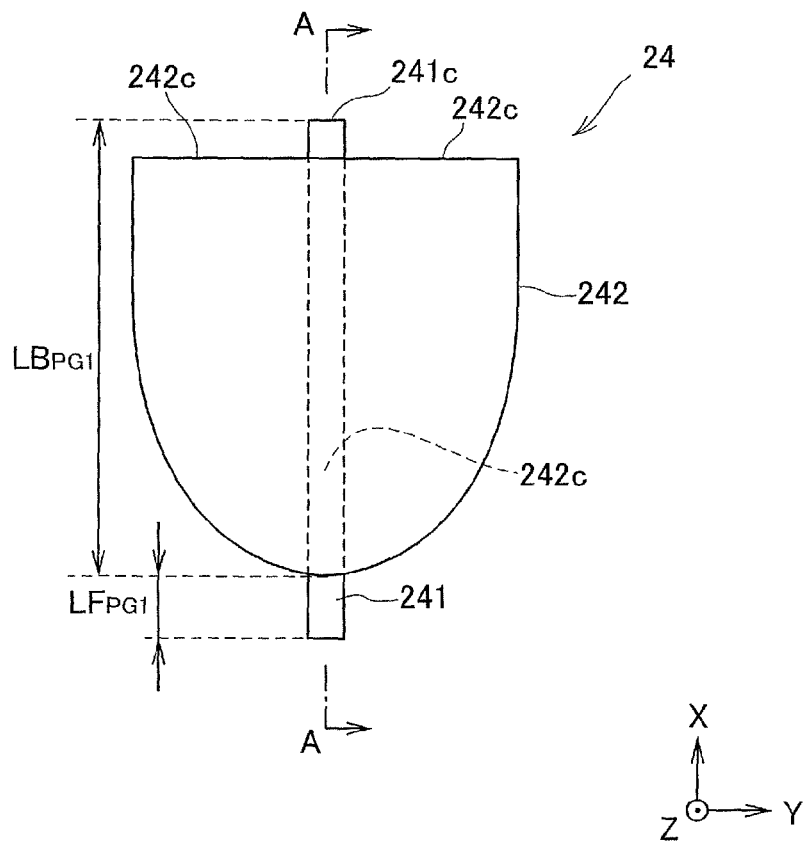
FIG. 10A is a plan view schematically showing another configuration example (No. 3) of the plasmon-generator in one embodiment of the present invention.
Figure 10B:
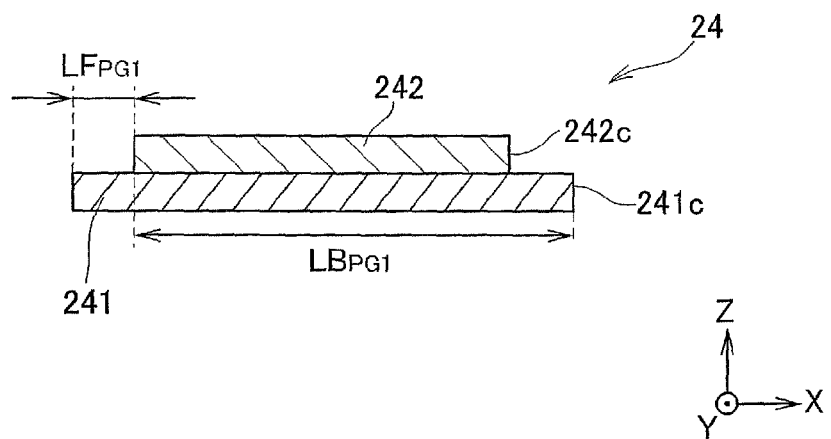
FIG. 10B is an A-A line cross-sectional view (XZ plane) in FIG. 10A.

Maximum values for the MH ratio and the heat gradient were calculated by simulation analysis similar to Example 1 except for use of the plasmon-generator 24 in the mode shown in FIGS. 10A and 10B. The simulation analysis results are shown in FIG. 16. Furthermore, in Example 2, the length of the first PG part 241 in the height direction (X-axis direction) was set to 1.1 µm. Further, the length LFPG1 of a portion not making contact with the second PG part 242 in the vicinity of the end surface 241$a$ of the first PG part 241 (see FIG. 10A and FIG. 10B) was set to 0.05 µm.

Example 3

Figure 9A:
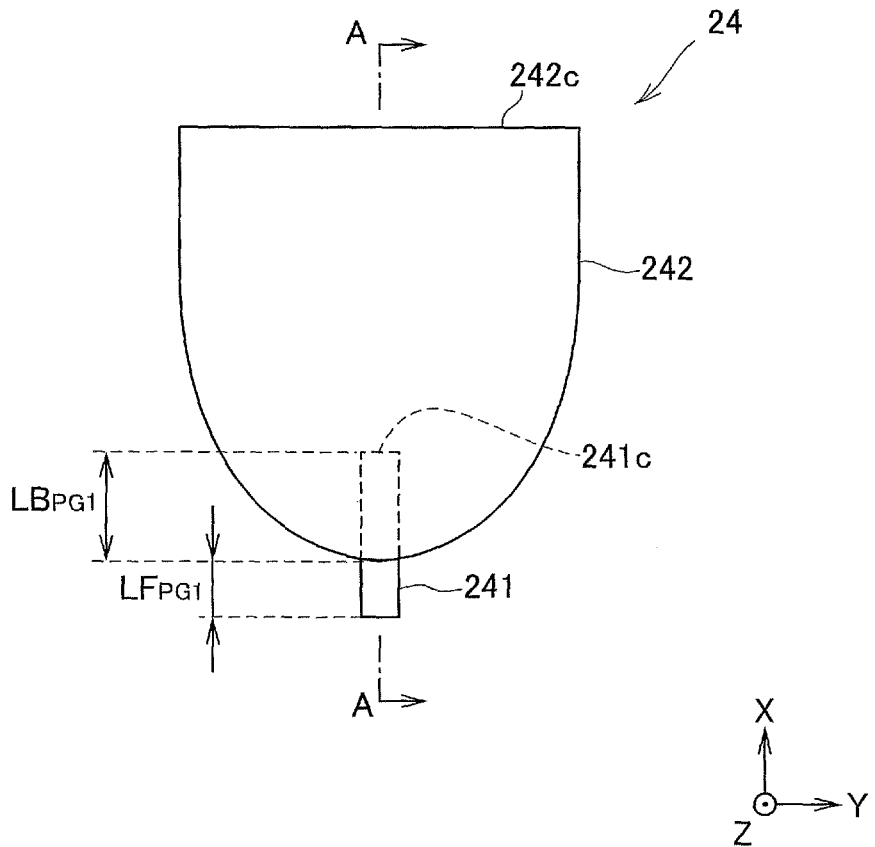
FIG. 9A is a plan view schematically showing another configuration example (No. 2) of the plasmon-generator in one embodiment of the present invention.
Figure 9B:
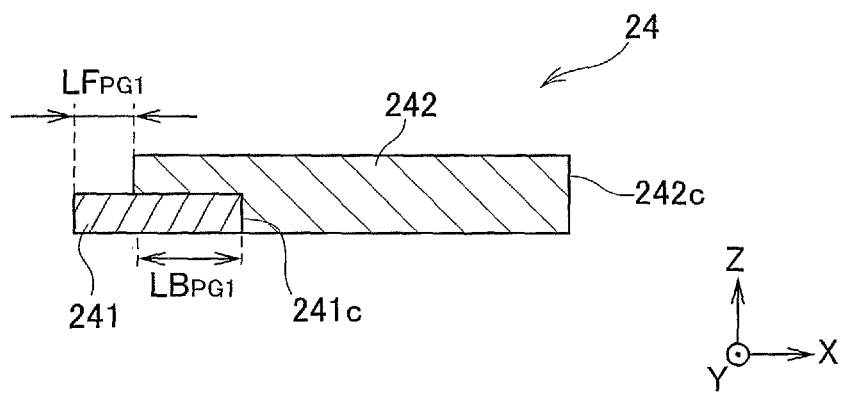
FIG. 9B is an A-A line cross-sectional view (XZ plane) in FIG. 9A.

Maximum values for the MH ratio and the heat gradient were calculated by simulation analysis similar to Example 1 except for use of the plasmon-generator 24 in the mode shown in FIGS. 9A and 9B. The simulation analysis results are shown in FIG. 16. Furthermore, in Example 3, the length of the first PG part 241 in the height direction (X-axis direction) was set to 0.15 µm. Further, the length LFPG1 of a portion not making contact with the second PG part 242 in the vicinity of the end surface 241$a$ of the first PG part 241 (see FIG. 9A and FIG. 9B) was set to 0.05 µm.

Comparative Example 1

Maximum values for the MH ratio and the heat gradient were calculated by simulation analysis similar to Example 1 except for use of the plasmon-generator 2400 in the mode shown in FIGS. 14A and 14B. The simulation analysis results are shown in FIG. 16. Furthermore, in Comparative example 1, the length LFPG1 of the first PG part 2401 in the height direction (X-axis direction) (see FIG. 14A and FIG. 14B) was set to 0.05 µm.

Comparative Example 2

Figure 15A:
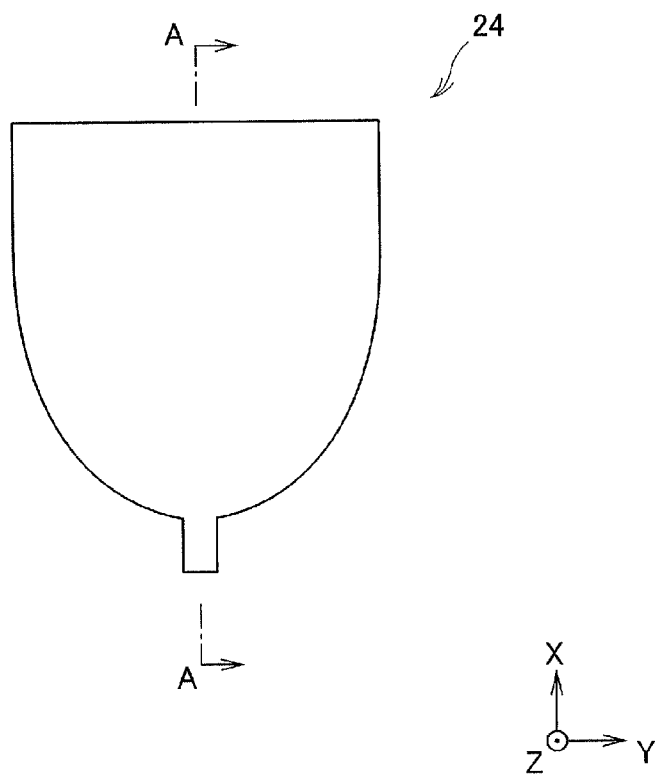
FIG. 15A is a plan view schematically showing a configuration example of the plasmon-generator in Comparative example 2 and Comparative example 3.
Figure 15B:
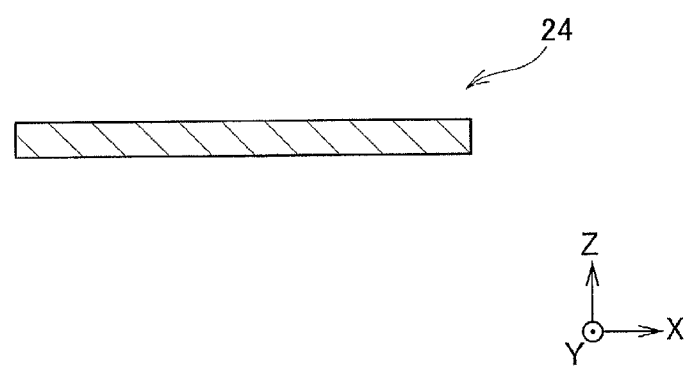
FIG. 15B is an A-A line cross-sectional view (XZ plane) in FIG. 15A.

Maximum values for the MH ratio and the heat gradient were calculated by simulation analysis similar to Example 1 except for use of the plasmon-generator 240 in the mode shown in FIG. 15 and configuring the entire plasmon-generator 240 with Au. The simulation analysis results are shown in FIG. 16.

Comparative Example 3

Maximum values for the MH ratio and the heat gradient were calculated by simulation analysis similar to Comparative Example 2 except for configuring the entire plasmon-generator 240 with AuCo (containing 0.9 at % of Co). The simulation analysis results are shown in FIG. 16.

As is clear from FIG. 16, the MH ratio and the heat gradient were superior in Comparative Example 2 where the entire plasmon-generator was configured with Au. In the meantime, in Comparative Example 3 where the entire plasmon-generator was configured with AuCo, a result with an inferior MH ratio and heat gradient was obtained. In the meantime, in Examples 1 to 3 and Comparative Example 1, the MH ratio and the heat gradient were excellent.

Experimental Example 2

The thermally-assisted magnetic recording head in Examples 1 to 3 and Comparative Example 1 was manufactured, as were thermally-assisted magnetic recording heads in which the length of the first PG part 24 in Example 3 was set in the height direction (X-axis direction) to 0.1 µm (Example 4), 0.2 µm (Example 5), 0.25 µm (Example 6), 0.3 µm (Example 7), 0.4 µm (Example 8), 0.5 µm (Example 9), and 0.6 µm (Example 10), and longevity tests of these thermally-assisted magnetic recording heads were conducted. Furthermore, in Examples 4 to 10, the length LFPG1 of a portion not making contact with the second PG part 242 in the vicinity of the end surface 241a of the first PG part 241 (see FIGS. 9A and 9B) was set to 0.05 μm.

Hundreds of thermally-assisted magnetic recording heads in Examples 1 to 10 and Comparative Example 1 were manufactured, respectively, and when near-field light (NF light) was generated continuously for 10 hours in each thermally-assisted magnetic recording head, out of 100 thermally-assisted magnetic recording heads, the number where deformation of the plasmon-generator occurred was measured as an error rate, and they were evaluated. The results are shown in Table 1.

As shown in Table 1, in the thermally-assisted magnetic recording heads in Comparative Example 1, the error rate was extremely high, but in the thermally-assisted magnetic recording heads in Examples 1 to 10, the error rate was low, and it was confirmed that it is possible to greatly reduce the error rate particularly with a configuration in which the length of the first PG part 241 in the height direction (X-axis direction) was set to 0.15 μm or greater and the second PG part 242 makes contact with both side surfaces of the first PG part 241.

As is clear from Experimental Example 1 and Experimental Example 2, as in Examples 1 to 10, because the plasmon-generator 24 is provided with the first PG part 241 made of a metal material having high thermostability and the second PG part 242 that makes contact with both side surfaces of the first PG part 241, and that is made of a metal material having high excitation efficiency of the surface plasmon, in the thermally-assisted magnetic recording head, the MH ratio and the heat gradient can be increased, and deformation of the plasmon-generator due to heat can be suppressed.

The invention claimed is:

1. A thermally-assisted magnetic recording head, comprising:
   a magnetic pole that generates a writing magnetic field from an end surface constituting a portion of a medium opposing surface that is opposed to a magnetic recording medium;
   a waveguide through which a light for exciting a surface plasmon propagates; and
   a plasmon-generator that generates near-field light (NF light) from a near-field light generating portion on a near field light generator end surface constituting a portion of the medium opposing surface by coupling with the light in a surface plasmon mode, wherein
   the plasmon-generator comprises a first PG part comprising the near field light generator end surface constituting a portion of the medium opposing surface, and a second PG part positioned at a back side relative to the medium opposing surface when viewed from the medium opposing surface side;
   when viewed from the medium opposing surface side, the first PG part extends toward the back side from the medium opposing surface;
   when viewed from the medium opposing surface side to allow a trailing side of the thermally-assisted magnetic recording head to be positioned upwardly, the second PG part is placed to contact at least a portion of both side surfaces of the first PG part;
   a material that substantially configures the first PG part is a material having high thermostability compared to a material that substantially configures the second PG part; and
   the material that substantially configures the second PG part is a material having high excitation efficiency of plasmon compared to the material that substantially configures the first PG part.

2. The thermally-assisted magnetic recording head according to claim 1, wherein
   the material that substantially configures second PG part is gold (Au), and the material that substantially configures the first PG part is a gold-containing alloy.

3. The thermally-assisted magnetic recording head according to claim 2, wherein the gold-containing alloy is an alloy of one or more elements selected from a group consisting of Cu, Co, Ni, Fe, Ta, Mg, Cr, Ti, Ag, Pt, Pd, Ru and Al, with Au (gold).

4. The thermally-assisted magnetic recording head according to claim 1, wherein the first PG part is generally cuboid-shaped.

5. The thermally-assisted magnetic recording head according to claim 1, wherein the second PG part comprises a front end portion positioned at the medium opposing surface side, and a rear end portion positioned at a back side compared to the front end portion;
   a width of the second PG part in the track width direction gradually increases from the front end portion toward the rear end portion.

6. The thermally-assisted magnetic recording head according to claim 1, wherein a length of the first PG part along a light propagation direction of the waveguide is 0.15 μm or more.

7. The thermally-assisted magnetic recording head according to claim 1, wherein the second PG part comprises a front end portion positioned at the medium opposing surface side, and a rear end portion positioned at the back side compared to the front end portion; and
   an end surface of the first PG part that is opposed to the end surface constituting a portion of the medium opposing surface is co-planar with the rear end portion of the second PG part.

8. The thermally-assisted magnetic recording head according to claim 1, wherein the second PG part comprises a front end portion positioned at the medium opposing surface side, and a rear end portion positioned at the back side compared to the front end portion; and
   an end surface of the first PG part that is opposed to the end surface constituting a portion of the medium opposing surface is positioned at the medium opposing surface side relative to the rear end portion of the second PG part.

9. The thermally-assisted magnetic recording head according to claim 1, wherein the second PG part comprises a front end portion positioned at the medium opposing surface side, and a rear end portion positioned at the back side relative to the front end portion; and
   an end surface of the first PG part that is opposed to the end surface constituting a portion of the medium opposing surface is positioned at the back side relative to the rear end portion of the second PG part.

10. A head gimbal assembly, comprising:
    the thermally-assisted magnetic recording head according to claim 1; and
    a suspension that supports the thermally-assisted magnetic recording head.

11. A magnetic recording apparatus, comprising:
    a magnetic recording medium;
    the thermally-assisted magnetic recording head according to claim 1; and
    a positioning device that supports the thermally-assisted magnetic recording head, and that is positioned relative to the magnetic recording medium.

* * * * *